United States Patent
Zhang et al.

(10) Patent No.: US 9,712,277 B2
(45) Date of Patent: Jul. 18, 2017

(54) CHANNEL QUALITY INDICATOR FEEDBACK METHOD AND APPARATUS, AND USER EQUIPMENT

(71) Applicant: Huawei Technologies Co., Ltd., Shenzhen (CN)

(72) Inventors: Peng Zhang, Shanghai (CN); Zongjie Wang, Shanghai (CN); Xueli Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 14/736,039

(22) Filed: Jun. 10, 2015

(65) Prior Publication Data
US 2015/0280860 A1 Oct. 1, 2015

Related U.S. Application Data

(63) Continuation of application No. PCT/CN2013/074531, filed on Apr. 22, 2013.

(30) Foreign Application Priority Data

Dec. 14, 2012 (WO) ............... PCT/CN2012/086690

(51) Int. Cl.
*H04W 4/00* (2009.01)
*H04L 1/00* (2006.01)
(Continued)

(52) U.S. Cl.
CPC ......... *H04L 1/0026* (2013.01); *H04B 7/0632* (2013.01); *H04L 5/0057* (2013.01);
(Continued)

(58) Field of Classification Search
CPC ....... H04W 74/04; H04W 72/04; H04W 4/00; H04W 72/12; H04L 5/005; H04L 5/0057; H04L 25/0026
(Continued)

(56) References Cited

U.S. PATENT DOCUMENTS

| 2006/0233131 A1 | 10/2006 | Gore et al. |
| 2007/0293233 A1 | 12/2007 | Inoue et al. |

(Continued)

FOREIGN PATENT DOCUMENTS

| CN | 101056459 A | 10/2007 |
| CN | 101094489 | 12/2007 |

(Continued)

OTHER PUBLICATIONS

"Remaining Issues in the Pilot Design Schemes in Four branch MIMO System," 3GPP TSG-RAN WG1, Meeting #70, R1-123754, Qingdao, China, 3rd Generation Partnership Project, Valbonne, France (Aug. 13-17, 2012).

(Continued)

*Primary Examiner* — Chi H Pham
*Assistant Examiner* — Alexander O Boakye
(74) *Attorney, Agent, or Firm* — Leydig, Voit & Mayer, Ltd.

(57) ABSTRACT

Embodiments of the present invention provide a channel quality indicator feedback method and apparatus, and a user equipment, so as to improve accuracy of channel quality reflection. The method includes: acquiring a first channel quality indicator $CQI_1$ based on detection of a pilot that is sent by a base station; acquiring a second channel quality indicator $CQI_2$ based on a result of detection of a demodulation pilot; and sending the first channel quality indicator $CQI_1$ and/or the second channel quality indicator $CQI_2$ to the base station in a manner in which the base station can (Continued)

distinguish the first channel quality indicator $CQI_1$ and/or the second channel quality indicator $CQI_2$. The method provided by the embodiments of the present invention objectively reflects a current channel quality status, so that the base station can acquire accurate channel quality information, thereby objectively scheduling data based on the channel quality information and improving data sending efficiency of a channel.

20 Claims, 11 Drawing Sheets

(51) Int. Cl.
*H04W 48/16* (2009.01)
*H04B 7/06* (2006.01)
*H04L 25/02* (2006.01)
*H04L 27/26* (2006.01)
*H04L 5/00* (2006.01)

(52) U.S. Cl.
CPC ...... *H04L 25/0226* (2013.01); *H04L 27/2613* (2013.01); *H04W 48/16* (2013.01); *H04L 5/005* (2013.01)

(58) Field of Classification Search
USPC .................................................. 370/328, 329
See application file for complete search history.

(56) References Cited

U.S. PATENT DOCUMENTS

| | | | |
|---|---|---|---|
| 2010/0034114 A1* | 2/2010 | Kim | .................. H04L 1/0026 370/252 |
| 2010/0238824 A1 | 9/2010 | Farajidana et al. | |
| 2012/0088458 A1 | 4/2012 | Nogami et al. | |
| 2013/0148533 A1 | 6/2013 | Li et al. | |
| 2013/0322288 A1 | 12/2013 | Zhang et al. | |

FOREIGN PATENT DOCUMENTS

| | | |
|---|---|---|
| CN | 101630967 A | 1/2010 |
| CN | 101754347 A | 6/2010 |
| CN | 101867457 A | 10/2010 |
| CN | 102378275 A | 3/2012 |
| CN | 102647751 A | 8/2012 |
| EP | 2385643 A1 | 11/2011 |

OTHER PUBLICATIONS

"CQI for Rel-7 FDD MIMO scheme," 3GPP TSG RAN WG1 Meeting #46, Tallinn, Estonia, Tdoc R1-061954, 3$^{rd}$ Generation Partnership Project, Valbonne, France (Aug. 28-Sep. 1, 2006).

* cited by examiner

CHANNEL QUALITY INDICATOR FEEDBACK METHOD AND APPARATUS, AND USER EQUIPMENT

CROSS-REFERENCE TO RELATED APPLICATIONS

This application is a continuation of International Patent Application No. PCT/CN2013/074531 filed on Apr. 22, 2013, which claims priority to International Application PCT/CN2012/086690, filed on Dec. 14, 2012, both of which are hereby incorporated by reference in their entireties.

TECHNICAL FIELD

The present invention relates to the field of mobile communications, and in particular, to a channel quality indicator feedback method and apparatus, and a user equipment.

BACKGROUND

The development of mobile communications technologies has resulted in continuous emergence of related new technologies. A Wideband Code Division Multiple Access (WCDMA) system is a 3rd generation wireless communications system that is most widely used currently. How to develop the WCDMA system so as to meet a requirement of a user for high-speed uplink and downlink data transmission is most important research work in the wireless communications field. From the fifth release (R5), a series of important technologies, such as high speed downlink packet access (HSDPA) and high speed uplink packet access (HSUPA), are introduced into WCDMA so as to increase uplink and downlink data transmission rates. After research of several releases, increasing transmission efficiency of a radio channel has reached a bottleneck.

In total transmit power of a base station of the WCDMA system, pilot occupies a relatively large portion. Functions of the pilot include determining cell coverage, channel estimation, and so on, where main functions of the channel estimation further include demodulating a shared channel (that is, phase reference), demodulating a control channel, demodulating a data channel, and measuring channel quality. In a single-antenna mode, the foregoing functions of the pilot are all implemented by a primary pilot that is continuously sent on a primary common pilot channel (P-CPICH), where transmit power of the primary pilot is determined by a network, and generally occupies 10% of the total transmit power of the base station. In a dual-antenna mode, the functions are jointly implemented by the primary pilot that is sent on the P-CPICH and a secondary pilot that is sent on a secondary common pilot channel (S-CPICH), where the primary pilot sent on the P-CPICH and the secondary pilot sent on the S-CPICH jointly implement functions of demodulating a data channel and measuring channel quality, and the primary pilot sent on the P-CPICH implements functions of determining cell coverage, demodulating a shared channel, and demodulating a control channel. The primary pilot and the secondary pilot are both sent continuously on their own pilot channel, and transmit power of the primary pilot and the secondary pilot is determined by the network. Generally, the primary pilot on the P-CPICH occupies 10% of the total transmit power of the base station, transmit power of the secondary pilot on the S-CPICH has a fixed deviation D (which is generally 3 dB) compared with the transmit power of the primary pilot on the P-CPICH, and the transmit power of the primary pilot and the secondary pilot occupies 15% of the total transmit power of the base station. The primary pilot on the P-CPICH and the secondary pilot on the S-CPICH are both transmitted directly without performing beamforming (Beam-forming).

For a user equipment (UE) end, after a user equipment receives a pilot signal, a feedback channel quality indicator (CQI) is provided based on measurement of the pilot signal. However, to save transmit power of a base station, after a special pilot that is specially used to implement demodulating a data channel is introduced into a side of the base station, the UE still feeds back a CQI to the base station according to measurement of the primary pilot but not based on measurement of the special pilot; that is, in the prior art, there is no mechanism of feeding back a CQI based on the special pilot that is introduced into the base station, and therefore, current channel quality cannot be reflected objectively and accurately.

SUMMARY

Embodiments of the present invention provide a channel quality indicator feedback method and apparatus, and a user equipment, so as to improve accuracy of reflection of channel quality.

According to a first aspect, an embodiment of the present invention provides a channel quality indicator feedback method, where the method includes: acquiring a first channel quality indicator $CQI_1$ based on detection of a pilot that is sent by a base station;

acquiring a second channel quality indicator $CQI_2$ based on a result of detection of a demodulation pilot; and sending the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$.

In a first possible implementation manner of the first aspect, the sending the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$ includes:

setting, in information of $W_1$ bits, the first channel quality indicator $CQI_1$ that is represented by using $N_1$ bits and the second channel quality indicator $CQI_2$ that is represented by using $M_1$ bits, and sending the information of the $W_1$ bits to the base station by using a high speed dedicated physical control channel HS-DPCCH subframe; or representing the first channel quality indicator $CQI_1$ by using $N_2$ bits, representing the second channel quality indicator $CQI_2$ by using $M_2$ bits, sending information of the $N_2$ bits to the base station by using the first $Q_1$ subframes of $P_1$ HS-DPCCH subframes, and sending information of the $M_2$ bits to the base station by using the last $P_1$-$Q_1$ subframes of the $P_1$ HS-DPCCH subframes; or sending a channel quality indicator that is represented by using L bits and a category indicator to the base station by using an HS-DPCCH subframe, where a value of the category indicator is used to indicate whether the channel quality indicator that is represented by using the L bits is the first channel quality indicator $CQI_1$ or the second channel quality indicator $CQI_2$, or a value of the category indicator is used to indicate whether the channel quality indicator that is represented by using the M bits is the first channel quality indicator $CQI_1$, or the first channel quality indicator $CQI_1$ and the second channel quality indicator $CQI_2$; or when the result of the detection of the demodulation pilot is that the demodulation pilot is not detected, sending the first channel quality indicator $CQI_1$ to the base station by using an HS-DPCCH subframe, and after the demodulation pilot is detected, according to an agreement with the base station, in a period of time from time $T_1$ to time $T_1'$ during sending a channel quality indicator, sending the second channel quality indicator $CQI_2$, or sending the first channel quality indicator $CQI_1$ and the second channel quality indicator $CQI_2$, and in a period of time except from time $T_1$ to time $T_1'$ during sending a channel quality indicator, sending the first channel quality indicator $CQI_1$; or spreading the first channel quality indicator $CQI_1$ to a first orthogonal variable spreading factor code, spreading the second channel quality indicator $CQI_2$ to a second orthogonal variable spreading factor code, and sending the spreaded first channel quality indicator $CQI_1$ and the spreaded second channel quality indicator $CQI_2$ to the base station by using an HS-DPCCH subframe.

In a second possible implementation manner of the first aspect, the sending the first channel quality indicator $CQI_1$, the second channel quality indicator $CQI_2$, and/or the third channel quality indicator $CQI_3$ to the base station in a manner in which the base station can distinguish the first channel quality indicator $CQI_1$ and/or the second channel quality indicator $CQI_2$ and/or the third channel quality indicator $CQI_3$ includes:

Setting, in information of $W_2$ bits, the first channel quality indicator $CQI_1$ that is represented by using $X_1$ bits, the second channel quality indicator $CQI_2$ that is represented by using $Y_1$ bits, and the third channel quality indicator $CQI_3$ that is represented by using $Z_1$ bits, and sending the information of the $W_2$ bits to the base station by using one HS-DPCCH subframe or two successive HS-DPCCH subframes; or after the first channel quality indicator $CQI_1$ is represented by using $X_2$ bits, the second channel quality indicator $CQI_2$ is represented by using $Y_2$ bits, and the third channel quality indicator $CQI_3$ is represented by using $Z_2$ bits, sending information of the $X_2$ bits and information of the $Z_2$ bits to the base station by using the first $Q_2$ subframes of $P_2$ HS-DPCCH subframes, and sending the information of the $X_2$ bits, information of the $Y_2$ bits, and the information of the $Z_2$ bits to the base station by using the last $P_2-Q_2$ subframes of the $P_2$ HS-DPCCH subframes; or sending a channel quality indicator that is represented by using X bits and a category indicator to the base station by using an HS-DPCCH subframe, where a value of the category indicator is used to indicate whether the channel quality indicator that is represented by using the X bits is the first channel quality indicator $CQI_1$ and the third channel quality indicator $CQI_3$, or is the second channel quality indicator $CQI_2$, or is the first channel quality indicator $CQI_1$, the second channel quality indicator $CQI_2$, and the third channel quality indicator $CQI_3$; or when the demodulation pilot is not detected, sending the first channel quality indicator $CQI_1$ and the second channel quality indicator $CQI_2$ to the base station by using an HS-DPCCH subframe, and after the demodulation pilot is detected, according to an agreement with the base station, in a period of time from time $T_2$ to time $T_2'$ during sending a channel quality indicator, sending the second channel quality indicator $CQI_2$, or sending the first channel quality indicator $CQI_1$, the second channel quality indicator $CQI_2$, and the third channel quality indicator $CQI_3$, and in a period of time except from time $T_2$ to time $T_2'$ during sending a channel quality indicator, sending the first channel quality indicator $CQI_1$ and the third channel quality indicator $CQI_3$; or spreading the first channel quality indicator $CQI_1$ and the third channel quality indicator $CQI_3$ to a first orthogonal variable spreading factor code, spreading the second channel quality indicator $CQI_2$ to a second orthogonal variable spreading factor code, and sending the spreaded first channel quality indicator $CQI_1$, the spreaded second channel quality indicator $CQI_2$, and the spreaded third channel quality indicator $CQI_3$ to the base station by using an HS-DPCCH subframe.

According to a second aspect, an embodiment of the present invention provides a channel quality indicator feedback method, where the method includes: acquiring a precoding indicator PCI and a first channel quality indicator $CQI_1$ based on detection of a pilot that is sent by a base station;

acquiring a second channel quality indicator $CQI_2$ based on a result of detection of a demodulation pilot; and sending the precoding indicator PCI, the first channel quality indicator $CQI_1$, and/or the second channel quality indicator $CQI_2$ to the base station in a manner in which the base station can distinguish the precoding indicator PCI, the first channel quality indicator $CQI_1$, and/or the second channel quality indicator $CQI_2$.

In a first possible implementation manner of the second aspect, the sending the precoding indicator PCI, the first channel quality indicator $CQI_1$, and/or the second channel quality indicator $CQI_2$ to the base station in a manner in which the base station can distinguish the precoding indicator PCI, the first channel quality indicator $CQI_1$, and/or the second channel quality indicator $CQI_2$ includes:

Setting, in information of $V_1$ bits, the first channel quality indicator $CQI_1$ that is represented by using $X_3$ bits, the second channel quality indicator $CQI_2$ that is represented by using $Y_3$ bits, and the precoding indicator PCI that is represented by using $Z_3$ bits, and sending the information of the $V_1$ bits to the base station by using a high speed dedicated physical control channel HS-DPCCH subframe; or after the first channel quality indicator $CQI_1$ is represented by using $X_4$ bits, the second channel quality indicator $CQI_2$ is represented by using $Y_4$ bits, and the precoding indicator PCI is represented by using $Z_4$ bits, sending information of the $X_4$ bits and information of the $Z_4$ bits to the base station by using the first $K_1$ subframes of $J_1$ HS-DPCCH subframes, and sending the information of the $X_4$ bits, information of the $Y_4$ bits, and the information of the $Z_4$ bits to the base station by using the last $J_1-K_1$ subframes of the $J_1$ HS-DPCCH subframes, or sending the information of the $X_4$ bits and information of the $Y_4$ bits to the base station by using the last $J_1-K_1$ subframes of the $J_1$ HS-DPCCH subframes; or sending a channel quality indicator that is represented by using M bits, a precoding indicator that is represented by using N bits, and a category indicator to the base station by using an HS-DPCCH subframe, where a value of the category indicator is used to indicate whether the channel quality indicator that is represented by using the M bits is the first channel quality indicator $CQI_1$ or the second channel quality indicator $CQI_2$, or is the first channel quality indicator $CQI_1$, or the first channel quality indicator $CQI_1$ and the second channel quality indicator $CQI_2$; or when the result of the detection of the demodulation pilot is that the demodulation pilot is not detected, sending the first channel quality indicator $CQI_1$ to the base station by using an HS-DPCCH subframe, and after the demodulation pilot is detected, according to an agreement with the base station, in a period of time from time $T_3$ to time $T_3'$ during sending an indicator, sending the second channel quality indicator $CQI_2$, or sending the second channel quality indicator $CQI_2$ and the precoding indicator PCI, or sending the first channel quality indicator $CQI_1$, the second channel quality indicator $CQI_2$, and the precoding indicator PCI, and in a period of time except from time $T_3$ to time $T_3'$ during sending an indicator, sending the first channel quality indicator $CQI_1$ and the precoding indicator PCI; or spreading the first channel quality indicator $CQI_1$ and the precoding indicator PCI to a first orthogonal variable spreading factor code, spreading the second channel quality indicator $CQI_2$ to a second orthogonal variable spreading factor code, and sending the spreaded first channel quality indicator $CQI_1$, the spreaded second channel quality indicator $CQI_2$, and the spreaded precoding indicator PCI to the base station by using an HS-DPCCH subframe.

In a second possible implementation manner of the second aspect, the sending the first channel quality indicator $CQI_1$ and/or the second channel quality indicator $CQI_2$ and/or the third channel quality indicator $CQI_3$ and/or the precoding indicator PCI to the base station in a manner in which the base station can distinguish the first channel quality indicator $CQI_1$ and/or the second channel quality indicator $CQI_2$ and/or the third channel quality indicator $CQI_3$ and/or the precoding indicator PCI includes:

Setting, in information of $V_2$ bits, the first channel quality indicator $CQI_1$ that is represented by using $X_5$ bits, the second channel quality indicator $CQI_2$ that is represented by using $Y_5$ bits, the third channel quality indicator $CQI_3$ that is represented by using $Z_5$ bits, and the precoding indicator PCI that is represented by using $L_1$ bits, and sending the information of the $V_2$ bits to the base station by using one HS-DPCCH subframe; or after the first channel quality indicator $CQI_1$ is represented by using $X_6$ bits, the second channel quality indicator $CQI_2$ is represented by using $Y_6$ bits, the third channel quality indicator $CQI_3$ is represented by using $Z_6$ bits, and the precoding indicator PCI is represented by using $L_2$ bits, sending information of the $X_6$ bits, information of the $Z_6$ bits, and information of the $L_2$ bits to the base station by using the first $K_2$ subframes of $J_2$ HS-DPCCH subframes, and sending the information of the $X_6$ bits, information of the $Y_6$ bits, and the information of the $Z_6$ bits, or sending the information of the $X_6$ bits, information of the $Y_6$ bits, the information of the $Z_6$ bits, and the information of the $L_2$ bits to the base station by using the last $J_2$-$K_2$ subframes of the $J_2$ HS-DPCCH subframes; or sending a channel quality indicator that is represented by using R bits, a precoding indicator that is represented by using S bits, and a category indicator to the base station by using an HS-DPCCH subframe, where a value of the category indicator is used to indicate whether the channel quality indicator that is represented by using the R bits and/or the precoding indicator that is represented by using the S bits is the first channel quality indicator $CQI_1$, the third channel quality indicator $CQI_3$, and the precoding indicator PCI, or is the second channel quality indicator $CQI_2$, or is the first channel quality indicator $CQI_1$, the second channel quality indicator $CQI_2$, and the third channel quality indicator $CQI_3$, or is the second channel quality indicator $CQI_2$ and the precoding indicator PCI, or is the first channel quality indicator $CQI_1$, the second channel quality indicator $CQI_2$, the third channel quality indicator $CQI_3$, and the precoding indicator PCI; or when the result of the detection of the demodulation pilot is that the demodulation pilot is not detected, sending the first channel quality indicator $CQI_1$ and the third channel quality indicator $CQI_3$ to the base station by using an HS-DPCCH subframe, and after the demodulation pilot is detected, according to an agreement with the base station, in a period of time from time $T_4$ to time $T_4'$ during sending an indicator, sending the second channel quality indicator $CQI_2$, or sending the first channel quality indicator $CQI_1$, the second channel quality indicator $CQI_2$, and the third channel quality indicator $CQI_3$, or sending the second channel quality indicator $CQI_2$ and the precoding indicator PCI, or sending the first channel quality indicator $CQI_1$, the second channel quality indicator $CQI_2$, the third channel quality indicator $CQI_3$, and the precoding indicator PCI, and in a period of time except from time $T_4$ to time $T_4'$ during sending an indicator, sending the first channel quality indicator $CQI_1$, the third channel quality indicator $CQI_3$, and the precoding indicator PCI; or spreading the first channel quality indicator $CQI_1$, the third channel quality indicator $CQI_3$, and the precoding indicator PCI to a first orthogonal variable spreading factor code, spreading the second channel quality indicator $CQI_2$ to a second orthogonal variable spreading factor code, and sending the spreaded first channel quality indicator $CQI_1$, the spreaded second channel quality indicator $CQI_2$, the spreaded third channel quality indicator $CQI_3$, and the precoding indicator PCI to the base station by using an HS-DPCCH subframe.

According to a third aspect, an embodiment of the present invention provides a channel quality indicator feedback apparatus, where the apparatus includes:

a first acquiring module, configured to acquire a first channel quality indicator $CQI_1$ based on detection of a pilot that is sent by a base station;

a second acquiring module, configured to acquire a second channel quality indicator $CQI_2$ based on a result of detection of a demodulation pilot; and a channel quality indicator sending module, configured to send the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$.

In a first possible implementation manner of the third aspect, the channel quality indicator sending module includes:

a first sending unit, configured to set, in information of $W_1$ bits, the first channel quality indicator $CQI_1$ that is represented by using $N_1$ bits and the second channel quality indicator $CQI_2$ that is represented by using $M_1$ bits, and send the information of the $W_1$ bits to the base station by using a high speed dedicated physical control channel HS-DPCCH subframe; or a second sending unit, configured to, after the first channel quality indicator $CQI_1$ is represented by using $N_2$ bits, and the second channel quality indicator $CQI_2$ is represented by using $M_2$ bits, send information of the $N_2$ bits to the base station by using the first $Q_1$ subframes of $P_1$ HS-DPCCH subframes, and send information of the $M_2$ bits to the base station by using the last $P_1$-$Q_1$ subframes of the $P_1$ HS-DPCCH subframes; or a third sending unit, configured to send a channel quality indicator that is represented by using L bits and a category indicator to the base station by using an HS-DPCCH subframe, where a value of the category indicator is used to indicate whether the channel quality indicator that is represented by using the L bits is the first channel quality indicator $CQI_1$ or the second channel quality indicator $CQI_2$, or a value of the category indicator is used to indicate whether the channel quality indicator that is represented by using the M bits is the first channel quality indicator $CQI_1$, or the first channel quality indicator $CQI_1$ and the second channel quality indicator $CQI_2$; or a fourth sending unit, configured to, when the result of the detection of the demodulation pilot is that the demodulation pilot is not detected, send the first channel quality indicator $CQI_1$ to the base station by using an HS-DPCCH subframe, and after the demodulation pilot is detected, according to an agreement with the base station, in a period of time from time $T_1$ to time $T_1'$ during sending a channel quality indicator, send the second channel quality indicator $CQI_2$, or send the first channel quality indicator $CQI_1$ and the second channel quality indicator $CQI_2$, and in a period of time except from time $T_1$ to time $T_1'$ during sending a channel quality indicator, send the first channel quality indicator $CQI_1$; or a fifth sending unit, configured to spread the first channel quality indicator $CQI_1$ to a first orthogonal variable spreading factor code, spread the second channel quality indicator $CQI_2$ to a second orthogonal variable spreading factor code, and send the spreaded first channel quality indicator $CQI_1$ and the spreaded second channel quality indicator $CQI_2$ to the base station by using an HS-DPCCH subframe.

In a second possible implementation manner of the third aspect, the channel quality indicator sending module includes:

a sixth sending unit, configured to set, in information of $W_2$ bits, the first channel quality indicator $CQI_1$ that is represented by using $X_1$ bits, the second channel quality indicator $CQI_2$ that is represented by using $Y_1$ bits, and the third channel quality indicator $CQI_3$ that is represented by using $Z_1$ bits, and send the information of the $W_2$ bits to the base station by using one HS-DPCCH subframe or two successive HS-DPCCH subframes; or a seventh sending unit, configured to, after the first channel quality indicator $CQI_1$ is represented by using $X_1$ bits, the second channel quality indicator $CQI_2$ is represented by using $Y_2$ bits, and the third channel quality indicator $CQI_3$ is represented by using $Z_2$ bits, send information of the $X_2$ bits and information of the $Z_2$ bits to the base station by using the first $Q_2$ subframes of $P_2$ HS-DPCCH subframes, and send the information of the $X_2$ bits, information of the $Y_2$ bits, and the information of the $Z_2$ bits to the base station by using the last $P_2$-$Q_2$ subframes of the $P_2$ HS-DPCCH subframes; or an eighth sending unit, configured to send a channel quality indicator that is represented by using X bits and a category indicator to the base station by using an HS-DPCCH subframe, where a value of the category indicator is used to indicate whether the channel quality indicator that is represented by using the X bits is the first channel quality indicator $CQI_1$ and the third channel quality indicator $CQI_3$, or is the second channel quality indicator $CQI_2$, or is the first channel quality indicator $CQI_1$, the second channel quality indicator $CQI_2$, and the third channel quality indicator $CQI_3$; or a ninth sending unit, configured to, when the demodulation pilot is not detected, send the first channel quality indicator $CQI_1$ and the second channel quality indicator $CQI_2$ to the base station by using an HS-DPCCH subframe, and after the demodulation pilot is detected, according to an agreement with the base station, in a period of time from time $T_2$ to time $T_2'$ during sending a channel quality indicator, send the second channel quality indicator $CQI_2$, or send the first channel quality indicator $CQI_1$, the second channel quality indicator $CQI_2$, and the third channel quality indicator $CQI_3$, and in a period of time except from time $T_2$ to time $T_2'$ during sending a channel quality indicator, send the first channel quality indicator $CQI_1$ and the third channel quality indicator $CQI_3$; or a tenth sending unit, configured to spread the first channel quality indicator $CQI_1$ and the third channel quality indicator $CQI_3$ to a first orthogonal variable spreading factor code, spread the second channel quality indicator $CQI_2$ to a second orthogonal variable spreading factor code, and send the spreaded first channel quality indicator $CQI_1$, the spreaded second channel quality indicator $CQI_2$, and the spreaded third channel quality indicator $CQI_3$ to the base station by using an HS-DPCCH subframe.

According to a fourth aspect, an embodiment of the present invention provides a channel quality indicator feedback apparatus, where the apparatus includes:

a first indicator acquiring module, configured to acquire a precoding indicator PCI and a first channel quality indicator $CQI_1$ based on detection of a pilot that is sent by a base station;

a second indicator acquiring module, configured to acquire a second channel quality indicator $CQI_2$ based on a result of detection of a demodulation pilot; and an indicator sending module, configured to send the precoding indicator PCI, the first channel quality indicator $CQI_1$, and/or the second channel quality indicator $CQI_2$ to the base station in a manner in which the base station can distinguish the precoding indicator PCI, the first channel quality indicator $CQI_1$, and/or the second channel quality indicator $CQI_2$.

In a first possible implementation manner of the fourth aspect, the indicator sending module includes:

a first indicator sending unit, configured to set, in information of $V_1$ bits, the first channel quality indicator $CQI_1$ that is represented by using $X_3$ bits, the second channel quality indicator $CQI_2$ that is represented by using $Y_3$ bits, and the precoding indicator PCI that is represented by using $Z_3$ bits, and send the information of the $V_1$ bits to the base station by using a high speed dedicated physical control channel HS-DPCCH subframe; or a second indicator sending unit, configured to, after the first channel quality indicator $CQI_1$ is represented by using $X_4$ bits, the second channel quality indicator $CQI_2$ is represented by using $Y_4$ bits, and the precoding indicator PCI is represented by using $Z_4$ bits, send information of the $X_4$ bits and information of the $Z_4$ bits to the base station by using the first $K_1$ subframes of $J_1$ HS-DPCCH subframes, and send the information of the $X_4$ bits, information of the $Y_4$ bits, and the information of the $Z_4$ bits to the base station by using the last $J_1$-$K_1$ subframes of the $J_1$ HS-DPCCH subframes, or send the information of the $X_4$ bits and information of the $Y_4$ bits to the base station by using the last $J_1$-$K_1$ subframes of the $J_1$ HS-DPCCH subframes; or a third indicator sending unit, configured to send a channel quality indicator that is represented by using M bits, a precoding indicator that is represented by using N bits, and a category indicator to the base station by using an HS-DPCCH subframe, where a value of the category indicator is used to indicate whether the channel quality indicator that is represented by using the M bits is the first channel quality indicator $CQI_1$ or the second channel quality indicator $CQI_2$, or is the first channel quality indicator $CQI_1$, or the first channel quality indicator $CQI_1$ and the second channel quality indicator $CQI_2$; or a fourth indicator sending unit, configured to, when the result of the detection of the demodulation pilot is that the demodulation pilot is not detected, send the first channel quality indicator $CQI_1$ to the base station by using an HS-DPCCH subframe, and after the demodulation pilot is detected, according to an agreement with the base station, in a period of time from time $T_3$ to time $T_3'$ during sending an indicator, send the second channel quality indicator $CQI_2$, or send the second channel quality indicator $CQI_2$ and the precoding indicator PCI, or send the first channel quality indicator $CQI_1$, the second channel quality indicator $CQI_2$, and the precoding indicator PCI, and in a period of time except from time $T_3$ to time $T_3'$ during sending an indicator, send the first channel quality indicator $CQI_1$ and the precoding indicator PCI; or a fifth indicator sending unit, configured to spread the first channel quality indicator $CQI_1$ and the precoding indicator PCI to a first orthogonal variable spreading factor code, spread the second channel quality indicator $CQI_2$ to a second orthogonal variable spreading factor code, and send the spreaded first channel quality indicator $CQI_1$, the spreaded second channel quality indicator $CQI_2$, and the spreaded precoding indicator PCI to the base station by using an HS-DPCCH subframe.

In a second possible implementation manner of the fourth aspect, the indicator sending module includes:

a sixth indicator sending unit, configured to set, in information of $V_2$ bits, the first channel quality indicator $CQI_1$ that is represented by using $X_5$ bits, the second channel quality indicator $CQI_2$ that is represented by using $Y_5$ bits, the third channel quality indicator $CQI_3$ that is represented by using $Z_5$ bits, and the precoding indicator PCI that is represented by using $L_1$ bits, and send the information of the $V_2$ bits to the base station by using one HS-DPCCH subframe; or a seventh indicator sending unit, configured to, after the first channel quality indicator $CQI_1$ is represented by using $X_6$ bits, the second channel quality indicator $CQI_2$ is represented by using $Y_6$ bits, the third channel quality indicator $CQI_3$ is represented by using $Z_6$ bits, and the precoding indicator PCI is represented by using $L_2$ bits, send information of the $X_6$ bits, information of the $Z_6$ bits, and information of the $L_2$ bits to the base station by using the first $K_2$ subframes of $J_2$ HS-DPCCH subframes, and send the information of the $X_6$ bits, information of the $Y_6$ bits, and the information of the $Z_6$ bits, or send the information of the $X_6$ bits, information of the $Y_6$ bits, the information of the $Z_6$ bits, and the information of the $L_2$ bits to the base station by using the last $J_2$-$K_2$ subframes of the $J_2$ HS-DPCCH subframes; or an eighth indicator sending unit, configured to send a channel quality indicator that is represented by using R bits, a precoding indicator that is represented by using S bits, and a category indicator to the base station by using an HS-DPCCH subframe, where a value of the category indicator is used to indicate whether the channel quality indicator that is represented by using the R bits and/or the precoding indicator that is represented by using the S bits is the first channel quality indicator $CQI_1$, the third channel quality indicator $CQI_3$, and the precoding indicator PCI, or is the second channel quality indicator $CQI_2$, or is the first channel quality indicator $CQI_1$, the second channel quality indicator $CQI_2$, and the third channel quality indicator $CQI_3$, or is the second channel quality indicator $CQI_2$ and the precoding indicator PCI, or is the first channel quality indicator $CQI_1$, the second channel quality indicator $CQI_2$, the third channel quality indicator $CQI_3$, and the precoding indicator PCI; or a ninth indicator sending unit, configured to, when the result of the detection of the demodulation pilot is that the demodulation pilot is not detected, send the first channel quality indicator $CQI_1$ and the third channel quality indicator $CQI_3$ to the base station by using an HS-DPCCH subframe, and after the demodulation pilot is detected, according to an agreement with the base station, in a period of time from time $T_4$ to time $T_4'$ during sending an indicator, send the second channel quality indicator $CQI_2$, or send the first channel quality indicator $CQI_1$, the second channel quality indicator $CQI_2$, and the third channel quality indicator $CQI_3$, or send the second channel quality indicator $CQI_2$ and the precoding indicator PCI, or send the first channel quality indicator $CQI_1$, the second channel quality indicator $CQI_2$, the third channel quality indicator $CQI_3$, and the precoding indicator PCI, and in a period of time except from time $T_4$ to time $T_4'$ during sending an indicator, send the first channel quality indicator $CQI_1$, the third channel quality indicator $CQI_3$, and the precoding indicator PCI; or a tenth indicator sending unit, configured to spread the first channel quality indicator $CQI_1$, the third channel quality indicator $CQI_3$, and the precoding indicator PCI to a first orthogonal variable spreading factor code, spread the second channel quality indicator $CQI_2$ to a second orthogonal variable spreading factor code, and send the spreaded first channel quality indicator $CQI_1$, the spreaded second channel quality indicator $CQI_2$, the spreaded third channel quality indicator $CQI_3$, and the precoding indicator PCI to the base station by using an HS-DPCCH subframe.

According to a fifth aspect, an embodiment of the present invention provides a computer storage medium, where a program may be stored in the computer storage medium, and when the program is executed, the steps of the channel quality indicator feedback method provided by the foregoing embodiments are included.

According to a sixth aspect, an embodiment of the present invention provides a user equipment, where the user equipment includes: an input apparatus, an output apparatus, a memory, and a processor, where the processor executes the following steps:

acquiring a first channel quality indicator $CQI_1$ based on detection of a pilot that is sent by a base station; acquiring a second channel quality indicator $CQI_2$ based on a result of detection of a demodulation pilot; and sending the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$.

According to a seventh aspect, an embodiment of the present invention provides a user equipment, where the user equipment includes: an input apparatus, an output apparatus, a memory, and a processor, where the processor executes the following steps:

acquiring a precoding indicator PCI and a first channel quality indicator $CQI_1$ based on detection of a pilot that is sent by a base station; acquiring a second channel quality indicator $CQI_2$ based on a result of detection of a demodulation pilot; and sending the precoding indicator PCI and/or the first channel quality indicator $CQI_1$ and/or the second channel quality indicator $CQI_2$ to the base station in a manner in which the base station can distinguish the precoding indicator PCI, the first channel quality indicator $CQI_1$, and/or the second channel quality indicator $CQI_2$.

According to an eighth aspect, an embodiment of the present invention provides a channel quality indicator feedback method, where the method includes:

acquiring a set of first channel state information $CSI_1$ based on detection of a first type of pilot;

acquiring a set of second channel state information $CSI_2$ based on detection of a second type of pilot;

acquiring a set of third channel state information $CSI_3$ based on joint detection of the first type of pilot and/or the second type of pilot; and sending channel state information in the sets to a base station in a manner in which the base station can distinguish the channel state information in the sets.

In a first possible implementation manner of the eighth aspect, the acquiring a set of first channel state information $CSI_1$ based on detection of a first type of pilot includes: acquiring a type-1 channel quality indicator $CQI_1$ and/or a type-1 precoding indicator $PCI_1$ based on detection of the primary pilot;

the acquiring a set of second channel state information $CSI_2$ based on detection of a second type of pilot includes: acquiring a type-2 channel quality indicator $CQI_2$ and/or a type-2 precoding indicator $PCI_2$ based on detection of the secondary pilot; and the acquiring a set of third channel state information $CSI_3$ based on joint detection of the first type of pilot and/or the second type of pilot includes: acquiring a type-3 channel quality indicator $CQI_3$ and/or a type-3 precoding indicator $PCI_3$ based on joint detection of the primary pilot and/or the secondary pilot.

In a second possible implementation manner of the eighth aspect, the sending channel state information in the sets to a base station in a manner in which the base station can distinguish the channel state information in the sets includes:

sending the channel state information in the sets to the base station by using a high speed dedicated physical control channel HS-DPCCH.

With reference to the second implementation manner of the eighth aspect, in a third possible implementation manner of the eighth aspect, the sending the channel state information in the sets to the base station by using a high speed dedicated physical control channel HS-DPCCH includes:

after the channel state information in the sets is represented by using different bits, when sending the channel state information to the base station, carrying the channel state information in the sets in corresponding bit positions of different HS-DPCCHs or in one or more subframes of a same HS-DPCCH; or using a number to perform category indication on the channel state information in the sets, and sending the channel state information in the sets and a corresponding number to the base station.

In a fourth possible implementation manner of the eighth aspect, the method further includes:

according to a specific requirement, selecting one or more pieces of channel state information from the set of first channel state information $CSI_1$ and/or the set of second channel state information $CSI_2$ and/or the set of third channel state information $CSI_3$, to form a set of fourth channel state information $CSI_4$; or, selecting, from the set of first channel state information $CSI_1$ and/or the set of second channel state information $CSI_2$ and/or the set of third channel state information $CSI_3$, channel state information reflecting a channel state that is best, relatively good, or better than a specific channel state, to form a set of fourth channel state information $CSI_4$.

With reference to the fourth implementation manner of the eighth aspect, in a fifth possible implementation manner of the eighth aspect, the sending channel state information in the sets to a base station in a manner in which the base station can distinguish the channel state information in the sets includes:

sending channel state information in the set of fourth channel state information $CSI_4$ to the base station by using a high speed dedicated physical control channel HS-DPCCH.

With reference to the fifth implementation manner of the eighth aspect, in a sixth possible implementation manner of the eighth aspect, the sending channel state information in the set of fourth channel state information $CSI_4$ to the base station by using a high speed dedicated physical control channel HS-DPCCH includes:

after the channel state information in the set of fourth channel state information $CSI_4$ is represented by using different bits, when sending the channel state information to the base station, carrying the channel state information in the set of fourth channel state information $CSI_4$ in corresponding bit positions of different HS-DPCCHs or in one or more subframes of a same HS-DPCCH; or using a number to perform category indication on the channel state information in the set of fourth channel state information $CSI_4$, and sending the channel state information in the set of fourth channel state information $CSI_4$ and a corresponding number to the base station.

According to a ninth aspect, an embodiment of the present invention provides a channel quality indicator feedback apparatus, where the apparatus includes:

a third acquiring module, configured to acquire a set of first channel state information $CSI_1$ based on detection of a first type of pilot;

a fourth acquiring module, configured to acquire a set of second channel state information $CSI_2$ based on detection of a second type of pilot;

a fifth acquiring module, configured to acquire a set of third channel state information $CSI_3$ based on joint detection of the first type of pilot and/or the second type of pilot; and a channel state information sending module, configured to send channel state information in the sets to a base station in a manner in which the base station can distinguish the channel state information in the sets.

With reference to the first implementation manner of the ninth aspect, in a second possible implementation manner of the ninth aspect, the first type of pilot includes a primary pilot sent on a primary common pilot channel, and the second type of pilot includes a secondary pilot sent on a secondary pilot channel;

the third acquiring module includes a third indicator acquiring unit, configured to acquire a type-1 channel quality indicator $CQI_1$ and/or a type-1 precoding indicator $PCI_1$ based on detection of the primary pilot;

the fourth acquiring module includes a fourth indicator acquiring unit, configured to acquire a type-2 channel quality indicator $CQI_2$ and/or a type-2 precoding indicator $PCI_2$ based on detection of the secondary pilot; and the fifth acquiring module includes a fifth indicator acquiring unit, configured to acquire a type-3 channel quality indicator $CQI_3$ and/or a type-3 precoding indicator $PCI_3$ based on joint detection of the primary pilot and/or the secondary pilot.

With reference to the first implementation manner of the ninth aspect, in a third possible implementation manner of the ninth aspect, the channel state information sending module includes:

a first sending submodule, configured to send the channel state information in the sets to the base station by using a high speed dedicated physical control channel HS-DPCCH.

With reference to the third implementation manner of the ninth aspect, in a fourth possible implementation manner of the ninth aspect, the first sending submodule includes:

an eleventh sending unit, configured to, after the channel state information in the sets is represented by using different bits, when sending the channel state information to the base station, carry the channel state information in the sets in corresponding bit positions of different HS-DPCCHs or in one or more subframes of a same HS-DPCCH; or a twelfth sending unit, configured to use a number to perform category indication on the channel state information in the sets, and send the channel state information in the sets and a corresponding number to the base station.

With reference to the first implementation manner of the ninth aspect, in a fifth possible implementation manner of the ninth aspect, the apparatus further includes:

a selecting module, configured to, according to a specific requirement, select one or more pieces of channel state information from the set of first channel state information $CSI_1$ and/or the set of second channel state information $CSI_2$ and/or the set of third channel state information $CSI_3$, to form a set of fourth channel state information $CSI_4$; or, select, from the set of first channel state information $CSI_1$ and/or the set of second channel state information $CSI_2$ and/or the set of third channel state information $CSI_3$, channel state information reflecting a channel state that is best, relatively good, or better than a specific channel state, to form a set of fourth channel state information $CSI_4$.

With reference to the fifth implementation manner of the ninth aspect, in a sixth possible implementation manner of the ninth aspect, the channel state information sending module includes:

a second sending submodule, configured to send channel state information in the set of fourth channel state information $CSI_4$ to the base station by using a high speed dedicated physical control channel HS-DPCCH.

With reference to the sixth implementation manner of the ninth aspect, in a seventh possible implementation manner of the ninth aspect, the second sending submodule includes:

a thirteenth sending unit, configured to, after the channel state information in the set of fourth channel state information $CSI_4$ is represented by using different bits, when sending the channel state information to the base station, carrying the channel state information in the set of fourth channel state information $CSI_4$ in corresponding bit positions of different high speed dedicated physical control channels HS-DPCCHs or in one or more subframes of a same HS-DPCCH; or a fourteenth sending unit, configured to use a number to perform category indication on the channel state information in the set of fourth channel state information $CSI_4$, and send the channel state information in the set of fourth channel state information $CSI_4$ and a corresponding number to the base station.

According to a tenth aspect, an embodiment of the present invention provides a computer storage medium, where a program may be stored in the computer storage medium, and when the program is executed, the steps according to any implementation manner of the ninth aspect are included.

According to an eleventh aspect, an embodiment of the present invention provides a user equipment, including: a receiver, a transmitter, a memory, and a processor; the receiver, the transmitter, and the memory are separately connected to the processor; the receiver receives a first type of pilot, a second type of pilot, and a third type of pilot; and the processor acquires a set of first channel state information $CSI_1$ based on detection of the first type of pilot, acquires a set of second channel state information $CSI_2$ based on detection of the second type of pilot, and acquires a set of third channel state information $CSI_3$ based on joint detection of the first type of pilot and/or the second type of pilot. The transmitter sends channel state information in the sets to a base station in a manner in which the base station can distinguish the channel state information in the sets.

It can be seen from the foregoing embodiments of the present invention, because a UE may send a first channel quality indicator $CQI_1$ that is acquired based on detection of a pilot sent by a base station and/or a second channel quality indicator $CQI_2$ that is acquired based on a result of detection of a demodulation pilot to the base station in a manner in which the base station can distinguish, the base station distinguishes the first channel quality indicator $CQI_1$ and the second channel quality indicator $CQI_2$ according to a sending manner of a channel quality indicator. Therefore, the method provided by the embodiments of the present invention objectively reflects a current channel quality status, so that the base station can acquire accurate channel quality information, thereby objectively scheduling data based on the channel quality information and improving data sending efficiency of a channel.

BRIEF DESCRIPTION OF DRAWINGS

To describe the technical solutions in the embodiments of the present invention more clearly, the following briefly introduces the accompanying drawings required for describing the prior art or the embodiments. Apparently, the accompanying drawings in the following description show merely some embodiments of the present invention, and a person skilled in the art may still derive other drawings from these accompanying drawings.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention shall fall within the protection scope of the present invention.

Figure 1:
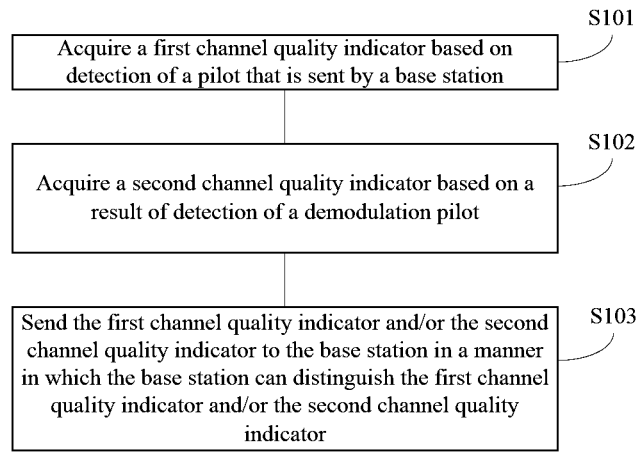
FIG. 1 is a schematic flowchart of a channel quality indicator feedback method according to an embodiment of the present invention.

Referring to FIG. 1, FIG. 1 is a schematic flowchart of a channel quality indicator feedback method according to an embodiment of the present invention, and the method may be executed by a user equipment (UE). The method shown in FIG. 1 is described below by using a WCDMA system in a single-antenna mode as an example. The method mainly includes step S101, step S102, and step S103:

S101: Acquire a first channel quality indicator $CQI_1$ based on detection of a pilot that is sent by a base station.

When the base station has no data to send to a UE, the base station sends a pilot, for example, a primary pilot, to the UE by using a P-CPICH. The UE acquires a channel quality indicator (CQI) by measuring the pilot that is sent on the P-CPICH. The CQI is a numeric value; when the CQI is represented by using N bits, a value range is any numeric value between 0 and $2^N-1$. The CQI has a mapping relationship with a data-block block length; that is, a value mapped by each CQI represents a largest data-block block length that the base station can allocate to a UE reporting the CQI. For example, if CQI=1, according to the mapping relationship, the largest data-block block length that the base station allocates to the UE reporting the CQI is 100 KB; if CQI=2, according to the mapping relationship, the largest data-block block length that the base station allocates to the UE reporting the CQI is 135 KB; and so on. For ease of description, the channel quality indicator that is acquired by the UE by detecting the pilot sent by the base station is referred to as a first channel quality indicator $CQI_1$.

When the pilot is a primary pilot sent on the P-CPICH, the acquiring a first channel quality indicator $CQI_1$ based on detection of a pilot that is sent by a base station may be acquiring the first channel quality indicator $CQI_1$ based on detection of the primary pilot that is sent by the base station.

S102: Acquire a second channel quality indicator $CQI_2$ based on a result of detection of a demodulation pilot.

In implementation of several functions of the pilot, power consumed by demodulating a data channel is greatest. To ensure that the function of demodulating a data channel is completed successfully, base stations in the prior art all allocate transmit power of the pilot according to a requirement of implementing this function. Because other functions of the pilot, for example, measuring channel quality can be implemented without relatively great power. Therefore, there is power waste in the manner of allocating transmit power of the pilot in the prior art. To save transmit power of the base station or allocate more power for data sending, a special pilot that is different from the primary pilot and a secondary pilot, for example, a demodulation pilot (DM-Pilot), may be introduced into a side of the base station. In this embodiment of the present invention, the DM-Pilot may specially be used to demodulate a data channel during estimating a channel.

In this embodiment of the present invention, the DM-Pilot is sent to the UE along with data when there is data transmitted, and directivity of the data is the same as that of the DM-Pilot. Specifically, the base station determines a direction and position of the UE relative to the base station by using an uplink signal of the UE, and then adjusts transmit orientation of the DM-Pilot for aiming at an area in which the UE is located. Because energy of the DM-Pilot and data that have the same directivity is concentrated in the area in which the UE is located, signal quality is relatively strong, transmit power during data sending is high, and a relatively large data block may be transmitted.

The UE detects the DM-Pilot, and acquires a channel quality indicator according to a result of detection. For ease of description, the channel quality indicator that is acquired by the UE based on the result of the detection of the DM-Pilot is referred to as a second channel quality indicator $CQI_2$. It should be noted that, the detection result of detecting the DM-Pilot includes that the DM-Pilot is not detected.

S103: Send the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$.

After acquiring the first channel quality indicator $CQI_1$ and the second channel quality indicator $CQI_2$, the UE reports the $CQI_1$ and the $CQI_2$ to the base station. It should be noted that, besides referring to the uplink signal, when receiving the first channel quality indicator $CQI_1$, the base station may further configure, by referring to the first channel quality indicator $CQI_1$, the DM-Pilot that is sent to the UE; and after receiving the second channel quality indicator $CQI_2$, the base station may still determine the direction and position of the UE relative to the base station by using the uplink signal of the UE, and configure the DM-Pilot again by referring to the second channel quality indicator $CQI_2$, for example, adjusting parameters such as a direction and beamwidth of the DM-Pilot.

Because the first channel quality indicator $CQI_1$ and the second channel quality indicator $CQI_2$ are measurement of different pilot signals and are reflection of quality of corresponding channels, the base station needs to distinguish the first channel quality indicator $CQI_1$ and the second channel quality indicator $CQI_2$. In this embodiment of the present invention, the sending the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$ may be any one of the following manner 1 to manner 5:

Manner 1: Combined feedback. That is, the first channel quality indicator $CQI_1$ that is represented by using $N_1$ bits and the second channel quality indicator $CQI_2$ that is represented by using $M_1$ bits are set in information of $W_1$ bits; the information of the $W_1$ bits is sent to the base station by using a high speed dedicated physical control channel (HS-DPCCH) subframe, where, $W_1$, $N_1$, and $M_1$ are all natural numbers; $W_1$ may be equal to a sum of $N_1$ and $M_1$, that is, $W_1=N_1+M_1$; when a reserved bit needs to be introduced, $W_1$ may also be greater than the sum of $N_1$ and $M_1$; if a compression scheme is introduced during encoding, $W_1$ may also be less than the sum of $N_1$ and $M_1$; and a relationship between $W_1$, $N_1$, and $M_1$ is not limited by this embodiment of the present invention. After receiving the information of the $W_1$ bits, the base station may parse, according to a communications protocol between the base station and the UE or negotiation with the UE by using signaling, the first channel quality indicator $CQI_1$ that is represented by using the $N_1$ bits and the second channel quality indicator $CQI_2$ that is represented by using the $M_1$ bits. For example, the first channel quality indicator $CQI_1$ that is represented by using the $N_1$ bits and the second channel quality indicator $CQI_2$ that is represented by using the $M_1$ bits are respectively set at the first $N_1$ bits and the last $M_1$ bits of the information of the $W_1$ bits; after receiving the information of the $W_1$ bits, the base station may parse, according to a communications protocol between the base station and the UE or negotiation with the UE by using signaling, that in the information of the $W_1$ bits, information of the first $N_1$ bits represents the first channel quality indicator $CQI_1$, and information of the last $M_1$ bits represents the second channel quality indicator $CQI_2$. For another example, the first channel quality indicator $CQI_1$ that is represented by using the $N_1$ bits and the second channel quality indicator $CQI_2$ that is represented by using the $M_1$ bits are respectively set at arbitrary $N_1$ bits and other $M_1$ bits of the information of the $W_1$ bits; after receiving the information of the $W_1$ bits, the base station may parse, according to a communications protocol between the base station and the UE or negotiation with the UE by using signaling, that information of the arbitrary $N_1$ bits in the information of the $W_1$ bits represents the first channel quality indicator $CQI_1$, and information of the other $M_1$ bits represents the second channel quality indicator $CQI_2$.

Manner 2: Time division feedback. That is, after the first channel quality indicator $CQI_1$ is represented by using $N_2$ bits, and the second channel quality indicator $CQI_2$ is represented by using $M_2$ bits, information of the $N_2$ bits is sent to the base station by using the first $Q_1$ subframes of $P_1$ HS-DPCCH subframes, and information of the $M_2$ bits is sent to the base station by using the last $P_1-Q_1$ subframes of the $P_1$ HS-DPCCH subframes. In this embodiment, $N_2$, $M_2$, $P_1$, and $Q_1$ are all natural numbers.

It should be noted that, in the foregoing manner 1 or manner 2, if the detection result of detecting the demodulation pilot by the UE is that the demodulation pilot is not detected, the information of the $M_2$ bits that is used to represent the second channel quality indicator $CQI_2$, or information of the $M_1$ bits that is in the information of the $W_1$ bits and is used to represent the second channel quality indicator $CQI_2$ is a value agreed on with the base station. For example, in manner 2, assuming that 5 bits (that is, $M_2=5$) are used to represent the second channel quality indicator $CQI_2$, when the detection result of detecting the demodulation pilot by the UE is that the demodulation pilot is not detected, the information of the $M_2$ bits that is used to represent the second channel quality indicator $CQI_2$ may be 00000 (binary) or 11111 (binary) agreed on with the base station, that is, 0 (decimal) or 32 (decimal). Similarly, in manner 1, if 4 bits (that is, $M_1=4$) in the information of the $W_1$ bits are used to represent the second channel quality indicator $CQI_2$, when the detection result of detecting the demodulation pilot by the UE is that the demodulation pilot is not detected, the information of the $M_1$ bits that is used to represent the second channel quality indicator $CQI_2$ may be 0000 (binary) or 1111 (binary) agreed on with the base station, that is, 0 (decimal) or 16 (decimal).

Manner 3: Independent feedback. That is, a channel quality indicator that is represented by using L bits and a category indicator are sent to the base station by using an HS-DPCCH subframe, where a value of the category indicator is used to indicate whether the channel quality indicator that is represented by using the L bits is the first channel quality indicator $CQI_1$ or the second channel quality indicator $CQI_2$, or is the first channel quality indicator $CQI_1$ or the first channel quality indicator $CQI_1$ and the second channel quality indicator $CQI_2$. In this embodiment, L is a natural number. For example, by using a simplest manner that the category indicator is 1 bit as an example, when the 1-bit category indicator is 0, it indicates that the channel quality indicator represented by using several bits is the first channel quality indicator $CQI_1$, and when the 1-bit category indicator is 1, it indicates that the channel quality indicator represented by using several bits is the second channel quality indicator $CQI_2$; or, when the 1-bit category indicator is 0, it indicates that the channel quality indicator represented by using several bits is the first channel quality indicator $CQI_1$, and when the 1-bit category indicator is 1, it indicates that the channel quality indicator represented by using several bits is the first channel quality indicator $CQI_1$ and the second channel quality indicator $CQI_2$.

When the foregoing category indicator is represented by using 1 bit, the category indicator may be encoded together with the first channel quality indicator $CQI_1$ or the second channel quality indicator $CQI_2$. For example, assuming that the channel quality indicator is represented by using 5 bits, the 5 bits and the 1-bit category indicator may form a 6-bit channel quality indicator part in the HS-DPCCH, where the 5 bits represent the first channel quality indicator $CQI_1$ or the second channel quality indicator $CQI_2$. The foregoing category indicator may also be carried on a channel on which the HS-DPCCH and a non HS-DPCCH are sent at the same time; for example, a 1-bit feedback information (FBI) part on a dedicated physical control channel (DPCCH) or a 1-bit happy bit (Happy Bit) part on an enhanced dedicated physical control channel (E-DPCCH).

It should be noted that, when the value of the category indicator indicates that the channel quality indicator represented by using the L bits is the first channel quality indicator $CQI_1$ and the second channel quality indicator $CQI_2$, the first channel quality indicator $CQI_1$ and the second channel quality indicator $CQI_2$ may be sent to the base station in the foregoing manner 1, that is, the manner of combined feedback; therefore, the base station can further distinguish the first channel quality indicator $CQI_1$ and the second channel quality indicator $CQI_2$, where a specific scheme is not further described, and refer to the foregoing embodiment of combined feedback.

Manner 4: Scheduled feedback. That is, when the demodulation pilot is not detected, the first channel quality indicator $CQI_1$ is sent to the base station by using an HS-DPCCH subframe; and after the demodulation pilot is detected, according to an agreement with the base station, in a period of time from time $T_1$ to time $T_1'$ during sending a channel quality indicator, the second channel quality indicator $CQI_2$ is sent, or the first channel quality indicator $CQI_1$ and the second channel quality indicator $CQI_2$ are sent, and in a period of time except from time $T_1$ to time $T_1'$ during sending a channel quality indicator, the first channel quality indicator $CQI_1$ is sent. In this way, if a channel quality indicator is received in the period of time from time $T_1$ to time $T_1'$, the base station may learn that the channel quality indicator is the second channel quality indicator $CQI_2$, or is the first channel quality indicator $CQI_1$ and the second channel quality indicator $CQI_2$; and if a channel quality indicator is received in the period of time except from time $T_1$ to time $T_1'$, the base station may learn that the channel quality indicator is the first channel quality indicator $CQI_1$.

Similarly, in the foregoing manner 4, when the channel quality indicator is the first channel quality indicator $CQI_1$ and the second channel quality indicator $CQI_2$, the first channel quality indicator $CQI_1$ and the second channel quality indicator $CQI_2$ may be sent to the base station in the foregoing manner 1, that is, the manner of combined feedback; therefore, the base station can further distinguish the first channel quality indicator $CQI_1$ and the second channel quality indicator $CQI_2$, where a specific scheme is not further described, and refer to the foregoing embodiment of combined feedback.

Manner 5: Code division feedback. That is, after the first channel quality indicator $CQI_1$ is spread to a first orthogonal variable spreading factor (OVSF) code, and the second channel quality indicator $CQI_2$ is spread to a second OVSF code, the first channel quality indicator $CQI_1$ and the second channel quality indicator $CQI_2$ are sent to the base station by using an HS-DPCCH subframe after being spreaded. Because two OVSF codes are completely orthogonal, interference is not generated when the two OVSF codes are sent at the same time. When receiving the two spreading codes, the base station may obtain the first channel quality indicator $CQI_1$ and the second channel quality indicator $CQI_2$ by despreading.

The pilot sent by the base station in step S101 includes a beamforming pilot (BeamForming Pilot, BF-Pilot) and the primary pilot sent on the primary common pilot channel. In this embodiment of the present invention, the beamforming pilot is a special pilot that is transmitted by the base station by using low power, and beamwidth of the beamforming pilot is narrower than beamwidth of the primary pilot sent on the primary common pilot channel. Optionally, a beam direction of the beamforming pilot may be time-varying.

When the base station has no data to send to a UE, the base station sends the P-CPICH and BF-Pilot to the UE. After receiving the P-CPICH and BF-Pilot, the UE reports to the base station a channel quality indicator that is the first channel quality indicator $CQI_1$ and is acquired based on detection of the primary pilot sent on the P-CPICH, and a channel quality indicator that is a third channel quality indicator $CQI_3$ and is acquired based on detection of the BF-Pilot. After receiving the first channel quality indicator $CQI_1$ and the third channel quality indicator $CQI_3$, the base station may configure a size of a sending data block for the UE by referring to the first channel quality indicator $CQI_1$ and/or the third channel quality indicator $CQI_3$. When the beam direction of the BF-Pilot covers a UE, a value of the third channel quality indicator $CQI_3$ is larger, and the base station may send, based on current beam directivity of the BF-Pilot and the third channel quality indicator $CQI_3$, the DM-Pilot and data to the UE. Directivity of the DM-Pilot is the same as that of the data. After detecting the DM-Pilot, the UE may report to the base station a channel quality indicator that is the second channel quality indicator $CQI_2$ and is acquired based on detection of the DM-Pilot. After receiving the second channel quality indicator $CQI_2$, the base station may schedule data for the UE by referring to the first channel quality indicator $CQI_1$, the second channel quality indicator $CQI_2$, and/or the third channel quality indicator $CQI_3$.

When the pilot sent by the base station includes the beamforming pilot, the method shown in FIG. 1 further includes: acquiring the third channel quality indicator $CQI_3$ based on detection of the beamforming pilot; and sending the third channel quality indicator $CQI_3$ to the base station in a manner in which the base station can distinguish the third channel quality indicator $CQI_3$. In this embodiment of the present invention, the sending the first channel quality indicator $CQI_1$, the second channel quality indicator $CQI_2$, and/or the third channel quality indicator $CQI_3$ to the base station in a manner in which the base station can distinguish the first channel quality indicator $CQI_1$, the second channel quality indicator $CQI_2$, and/or the third channel quality indicator $CQI_3$ may be any one of the following manner 6 to manner 10:

Manner 6: Combined feedback. That is, the first channel quality indicator $CQI_1$ that is represented by using $X_1$ bits, the second channel quality indicator $CQI_2$ that is represented by using $Y_1$ bits, and the third channel quality indicator $CQI_3$ that is represented by using $Z_1$ bits are set in information of $W_2$ bits; the information of the $W_2$ bits is sent to the base station by using one HS-DPCCH subframe or two successive HS-DPCCH subframes, where, $W_2$, $X_1$, $Y_1$, and $Z_1$ are all natural numbers; $W_2$ may be equal to a sum of $X_1$, $Y_1$, and $Z_1$, that is, $W_2=X_1+Y_1+Z_1$; when a reserved bit needs to be introduced, $W_2$ may also be greater than the sum of $X_1$, $Y_1$, and $Z_1$; if a compression scheme is introduced during encoding, $W_2$ may also be less than the sum of $X_1$, $Y_1$, and $Z_1$; and a relationship between $W_2$, $X_1$, $Y_1$, and $Z_1$ is not limited by this embodiment of the present invention.

After receiving the information of the $W_2$ bits, the base station may parse, according to a communications protocol between the base station and the UE or negotiation with the UE by using signaling, the first channel quality indicator $CQI_1$ that is represented by using the $X_1$ bits, the second channel quality indicator $CQI_2$ that is represented by using the $Y_1$ bits, and the third channel quality indicator $CQI_3$ that is represented by using the $Z_1$ bits. For example, the first channel quality indicator $CQI_1$ that is represented by using the $X_1$ bits, the second channel quality indicator $CQI_2$ that is represented by using the $Y_1$ bits, and the third channel quality indicator $CQI_3$ that is represented by using the $Z_1$ bits are respectively set at the first $X_1$ bits, middle $Y_1$ bits, and the last $Z_1$ bits of the information of the $W_2$ bits; after receiving the information of the $W_2$ bits, the base station may parse, according to a communications protocol between the base station and the UE or negotiation with the UE by using signaling, that in the information of the $W_2$ bits, information of the first $X_1$ bits represents the first channel quality indicator $CQI_1$, information of the middle $Y_1$ bits represents the second channel quality indicator $CQI_2$, and information of the last $Z_1$ bits represents the third channel quality indicator $CQI_3$. For another example, the first channel quality indicator $CQI_1$ that is represented by using the $X_1$ bits, the second channel quality indicator $CQI_2$ that is represented by using the $Y_1$ bits, and the third channel quality indicator $CQI_3$ that is represented by using the $Z_1$ bits are respectively set at arbitrary $X_1$ bits, arbitrary $Y_1$ bits, and other $Z_1$ bits of the information of the $W_2$ bits; after receiving the information of the $W_2$ bits, the base station may parse, according to a communications protocol between the base station and the UE or negotiation with the UE by using signaling, that in the information of the $W_2$ bits, information of the arbitrary $X_1$ bits represents the first channel quality indicator $CQI_1$, information of the arbitrary $Y_1$ bits represents the second channel quality indicator $CQI_2$, and information of the other $Z_1$ bits represents the third channel quality indicator $CQI_3$.

Manner 7: Time division feedback. That is, after the first channel quality indicator $CQI_1$ is represented by using $X_2$ bits, the second channel quality indicator $CQI_2$ is represented by using $Y_2$ bits, and the third channel quality indicator $CQI_3$ is represented by using $Z_2$ bits, information of the $X_2$ bits and information of the $Z_2$ bits are sent to the base station by using the first $Q_2$ subframes of $P_2$ HS-DPCCH subframes, and the information of the $X_2$ bits, information of the $Y_2$ bits, and the information of the $Z_2$ bits are sent to the base station by using the last $P_2$-$Q_2$ subframes of the $P_2$ HS-DPCCH subframes. In this embodiment, $X_2$, $Y_2$, $Z_2$, $P_2$, and $Q_2$ are all natural numbers.

It should be noted that, in the foregoing manner 6 or manner 7, if the detection result of detecting the demodulation pilot by the UE is that the demodulation pilot is not detected, the information of the $Y_2$ bits that is used to represent the second channel quality indicator $CQI_2$, or information of the $Y_1$ bits that is in the information of the $W_2$ bits and is used to represent the second channel quality indicator $CQI_2$ is a value agreed on with the base station. For example, in manner 7, assuming that 5 bits (that is, $Y_2$=5) are used to represent the second channel quality indicator $CQI_2$, when the detection result of detecting the demodulation pilot by the UE is that the demodulation pilot is not detected, the information of the $Y_2$ bits that is used to represent the second channel quality indicator $CQI_2$ may be 00000 (binary) or 11111 (binary) agreed on with the base station, that is, 0 (decimal) or 32 (decimal). Similarly, in manner 6, if 4 bits (that is, $Y_1$=4) in the information of the $W_2$ bits are used to represent the second channel quality indicator $CQI_2$, when the detection result of detecting the demodulation pilot by the UE is that the demodulation pilot is not detected, the information of the $Y_1$ bits that is used to represent the second channel quality indicator $CQI_2$ may be 0000 (binary) or 1111 (binary) agreed on with the base station, that is, 0 (decimal) or 16 (decimal).

Manner 8: Mixed feedback. That is, a channel quality indicator that is represented by using X bits and a category indicator are sent to the base station by using an HS-DPCCH subframe, where a value of the category indicator is used to indicate whether the channel quality indicator that is represented by using the X bits is the first channel quality indicator $CQI_1$ and the third channel quality indicator $CQI_3$, or the second channel quality indicator $CQI_2$; or is the second channel quality indicator $CQI_2$, or the first channel quality indicator $CQI_1$, the second channel quality indicator $CQI_2$ and the third channel quality indicator $CQI_3$; or is the first channel quality indicator $CQI_1$ and the third channel quality indicator $CQI_3$, or the first channel quality indicator $CQI_1$, the second channel quality indicator $CQI_2$, and the third channel quality indicator $CQI_3$. In this embodiment, X is a natural number. For example, by using a simplest manner that the category indicator is 1 bit as an example, when the 1-bit category indicator is 0, it indicates that the channel quality indicator represented by using the X bits is the first channel quality indicator $CQI_1$ and the third channel quality indicator $CQI_3$, and when the 1-bit category indicator is 1, it indicates that the channel quality indicator represented by using the X bits is the second channel quality indicator $CQI_2$; or, when the 1-bit category indicator is 0, it indicates that the channel quality indicator represented by using the X bits is the second channel quality indicator $CQI_2$, and when the 1-bit category indicator is 1, it indicates that the channel quality indicator represented by using the X bits is the first channel quality indicator $CQI_1$, the second channel quality indicator $CQI_2$, and the third channel quality indicator $CQI_3$; or, when the 1-bit category indicator is 0, it indicates that the channel quality indicator represented by using the X bits is the first channel quality indicator $CQI_1$ and the third channel quality indicator $CQI_3$, and when the 1-bit category indicator is 1, it indicates that the channel quality indicator represented by using the X bits is the first channel quality indicator $CQI_1$, the second channel quality indicator $CQI_2$, and the third channel quality indicator $CQI_3$.

When the category indicator is represented by using 1 bit, the category indicator may be carried on a channel on which the HS-DPCCH and a non HS-DPCCH are sent at the same time; for example, a 1-bit FBI part on a DPCCH or a 1-bit happy bit (Happy Bit) part on an E-DPCCH.

It should be noted that, in the foregoing manner 8, when the value of the category indicator indicates that the channel quality indicator represented by using the X bits is more than one type of channel quality indicator, for example, the value of the category indicator indicates that the channel quality indicator represented by using the X bits is the first channel quality indicator $CQI_1$, the second channel quality indicator $CQI_2$, and the third channel quality indicator $CQI_3$, the first channel quality indicator $CQI_1$, the second channel quality indicator $CQI_2$, and the third channel quality indicator $CQI_3$ may be sent to the base station in the foregoing manner 6, that is, the manner of combined feedback; therefore, the base station can further distinguish the first channel quality indicator $CQI_1$, the second channel quality indicator $CQI_2$, and the third channel quality indicator $CQI_3$, where a specific scheme is not further described, and refer to the foregoing embodiment of combined feedback.

Manner 9: Scheduled feedback. That is, when the demodulation pilot is not detected, the first channel quality indicator $CQI_1$ and the second channel quality indicator $CQI_2$ are sent to the base station by using an HS-DPCCH subframe; and after the demodulation pilot is detected, according to an agreement with the base station, in a period of time from time $T_2$ to time $T_2'$ during sending a channel quality indicator, the second channel quality indicator $CQI_2$ is sent, or the first channel quality indicator $CQI_1$, the second channel quality indicator $CQI_2$, and the third channel quality indicator $CQI_3$ are sent, and in a period of time except from time $T_2$ to time $T_2'$ during sending a channel quality indicator, the first channel quality indicator $CQI_1$ and the third channel quality indicator $CQI_3$ are sent. In this way, if a channel quality indicator is received in the period of time from time $T_2$ to time $T_2'$, the base station may learn that the channel quality indicator is the second channel quality indicator $CQI_2$, or is the first channel quality indicator $CQI_1$, the second channel quality indicator $CQI_2$, and the third channel quality indicator $CQI_3$; and if a channel quality indicator is received in the period of time except from time $T_2$ to time $T_2'$, the base station may learn that the channel quality indicator is the first channel quality indicator $CQI_1$ and the third channel quality indicator $CQI_3$.

Similarly, in the foregoing manner 9, when more than one type of channel quality indicator is sent in the period of time from time $T_2$ to time $T_2'$ or in the period of time except from time $T_2$ to time $T_2'$, for example, the first channel quality indicator $CQI_1$, the second channel quality indicator $CQI_2$, and the third channel quality indicator $CQI_3$ are sent in the period of time from time $T_2$ to time $T_2'$ during sending a channel quality indicator, the first channel quality indicator $CQI_1$, the second channel quality indicator $CQI_2$, and the third channel quality indicator $CQI_3$ may also be sent to the base station in the foregoing manner 6, that is, the manner of combined feedback; therefore, the base station can further distinguish the first channel quality indicator $CQI_1$, the second channel quality indicator $CQI_2$, and the third channel quality indicator $CQI_3$, where a specific scheme is not further described, and refer to the foregoing embodiment of combined feedback.

Manner 10: Code division feedback. That is, after the first channel quality indicator $CQI_1$ and the third channel quality indicator $CQI_3$ are spread to a first OVSF code, and the second channel quality indicator $CQI_2$ is spread to a second OVSF code, the first channel quality indicator $CQI_1$, the second channel quality indicator $CQI_2$, and the third channel quality indicator $CQI_3$ are sent to the base station by using an HS-DPCCH subframe after being spreaded. Because two OVSF codes are completely orthogonal, interference is not generated when the two OVSF codes are sent at the same time. When receiving the two spreading codes, the base station may obtain the first channel quality indicator $CQI_1$ and the second channel quality indicator $CQI_2$ by despreading.

It can be seen from the foregoing channel quality indicator feedback method provided by the embodiment of the present invention, because a UE may send a first channel quality indicator $CQI_1$ that is acquired based on detection of a pilot sent by a base station and/or a second channel quality indicator $CQI_2$ that is acquired based on a result of detection of a demodulation pilot to the base station in a manner in which the base station can distinguish, the base station distinguishes the first channel quality indicator $CQI_1$ and the second channel quality indicator $CQI_2$ according to a sending manner of a channel quality indicator. Therefore, the method provided by the embodiment of the present invention objectively reflects a current channel quality status, so that the base station can acquire accurate channel quality information, thereby objectively scheduling data based on the channel quality information and improving data sending efficiency of a channel.

Figure 2:
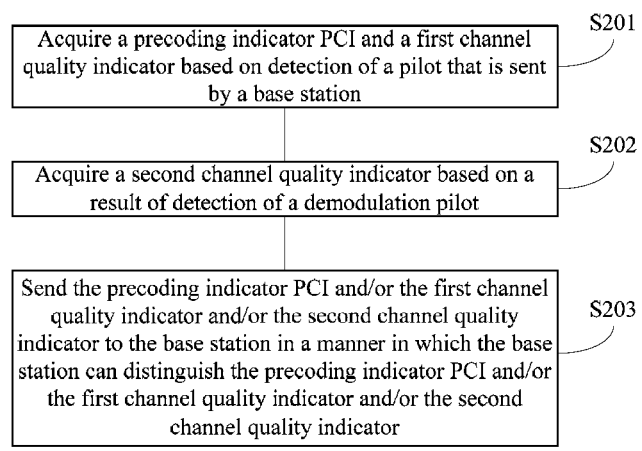
FIG. 2 is a schematic flowchart of a channel quality indicator feedback method according to another embodiment of the present invention.

Referring to FIG. 2, FIG. 2 is a schematic flowchart of a channel quality indicator feedback method according to another embodiment of the present invention, and the method may be executed by a UE in a mobile communications system including a base station and a user equipment (UE). The method shown in FIG. 2 is described by using a WCDMA system in a multiple-antenna mode (for example, a dual-antenna mode) as an example. The method mainly includes step S201, step S202, and step S203:

S201: Acquire a precoding indicator PCI and a first channel quality indicator $CQI_1$ based on detection of a pilot that is sent by a base station.

In a case that the multiple-antenna mode is a dual-antenna mode, the pilot sent by the base station includes a primary pilot that is sent on a primary common pilot channel and a secondary pilot that is sent on a secondary common pilot channel, and that a UE acquires a precoding indicator PCI and a first channel quality indicator $CQI_1$ based on detection of a pilot that is sent by a base station includes: acquiring the precoding indicator (PCI) based on detection of the primary pilot and the secondary pilot that are sent by the base station, and acquiring the first channel quality indicator $CQI_1$ based on detection of the primary pilot and the secondary pilot that are sent by the base station.

In this embodiment of the present invention, when the PCI is represented by using L bits, a value range of the PCI is 0 to $2^L-1$, a value of each PCI represents a combination of precoding weighted values, for example, specific numeric numbers of a precoding weighted value w1 and a precoding weighted value w2. The base station uses the PCI to determine precoding of data that is to be sent to the UE, so that transmitted data has relatively good quality of reception at the UE, and the PCI is used to determine a size of a data packet that is to be sent to the UE. In the dual-antenna mode, when the base station has no data to send to the UE, the UE can receive only the primary pilot sent on the P-CPICH and the secondary pilot sent on the S-CPICH. The UE detects the primary pilot and the secondary pilot that are sent by the base station to acquire the precoding indicator (PCI), and detects the primary pilot and the secondary pilot that are sent by the base station to acquire a new channel quality indicator, that is, the first channel quality indicator $CQI_1$.

S202: Acquire a second channel quality indicator $CQI_2$ based on a result of detection of a demodulation pilot, where the result of the detection of the demodulation pilot includes that the demodulation pilot is not detected, and the demodulation pilot is used to demodulate a data channel during estimating a channel.

Similar to the embodiment of the single-antenna mode described above, in the case that the multiple-antenna mode is the dual-antenna mode, to save transmit power of the base station or allocate more power for data sending, a special pilot that is different from the primary pilot and the secondary pilot, for example, the demodulation pilot (DM-Pilot), may be introduced into a side of the base station. Because it is the dual-antenna mode, the base station may send two DM-Pilots, which are DM-Pilot1 and DM-Pilot2, by using two antennas. In this embodiment, the DM-Pilot1 and DM-Pilot2 may specially be used to demodulate a data channel during estimating a channel. Beamforming (Beamforming) may be performed on the DM-Pilot1 and DM-Pilot2 in a precoding manner, so that the DM-Pilot1 and DM-Pilot2 have certain directivity; only when there is data to be transmitted, the DM-Pilot1 and DM-Pilot2 are transmitted together with the data, and precoding used for the data is consistent with that of the DM-Pilot.

When the base station sends data to the UE, and the data is accompanied by the DM-Pilot1 and DM-Pilot2, the UE may report to the base station a channel quality indicator that is obtained based on measurement of the DM-Pilot1 and DM-Pilot2, that is, the second channel quality indicator $CQI_2$. After receiving the second channel quality indicator $CQI_2$, the base station may configure, by referring to the first channel quality indicator $CQI_1$ and/or the second channel quality indicator $CQI_2$, a size of a data block sent to the UE, and may configure the DM-Pilot1 and DM-Pilot2 for the UE by referring to the PCI.

S203: Send the precoding indicator PCI and/or the first channel quality indicator $CQI_1$ and/or the second channel quality indicator $CQI_2$ to the base station in a manner in which the base station can distinguish the precoding indicator PCI and/or the first channel quality indicator $CQI_1$ and/or the second channel quality indicator $CQI_2$.

In this embodiment of the present invention, the sending the precoding indicator PCI and/or the first channel quality indicator $CQI_1$ and/or the second channel quality indicator $CQI_2$ to the base station in a manner in which the base station can distinguish the precoding indicator PCI, the first channel quality indicator $CQI_1$, and/or the second channel quality indicator $CQI_2$ may be any one of the following manner 11 to manner 15:

Manner 11: Combined feedback. That is, the first channel quality indicator $CQI_1$ that is represented by using $X_3$ bits, the second channel quality indicator $CQI_2$ that is represented by using $Y_3$ bits, and the precoding indicator PCI that is represented by using $Z_3$ bits are set in information of $V_1$ bits; the information of the $V_1$ bits is sent to the base station by using a high speed dedicated physical control channel HS-DPCCH subframe, where, $V_1$, $X_3$, $Y_3$, and $Z_3$ are all natural numbers; $V_1$ may be equal to a sum of $X_3$, $Y_3$, and $Z_3$, that is, $V_1=X_3+Y_3+Z_3$; when a reserved bit needs to be introduced, $V_1$ may also be greater than the sum of $X_3$, $Y_3$, and $Z_3$; if a compression scheme is introduced during encoding, $V_1$ may also be less than the sum of $X_3$, $Y_3$, and $Z_3$; and a relationship between $V_1$, $X_3$, $Y_3$, and $Z_3$ is not limited by this embodiment of the present invention. After receiving the information of the $V_1$ bits, the base station may parse, according to a communications protocol between the base station and the UE or negotiation with the UE by using signaling, the first channel quality indicator $CQI_1$ that is represented by using the $X_3$ bits, the second channel quality indicator $CQI_2$ that is represented by using the $Y_3$ bits, and the precoding indicator PCI that is represented by using the $Z_3$ bits. For example, the first channel quality indicator $CQI_1$ that is represented by using the $X_3$ bits, the second channel quality indicator $CQI_2$ that is represented by using the $Y_3$ bits, and the precoding indicator PCI that is represented by using the $Z_3$ bits are respectively set at the first $X_3$ bits, middle $Y_1$ bits, and the last $Z_3$ bits of the information of the $V_1$ bits; after receiving the information of the $V_1$ bits, the base station may parse, according to a communications protocol between the base station and the UE or negotiation with the UE by using signaling, that in the information of the $V_1$ bits, information of the first $X_3$ bits represents the first channel quality indicator $CQI_1$, information of the middle $Y_3$ bits represents the second channel quality indicator $CQI_2$, and information of the last $Z_3$ bits represents the precoding indicator PCI. For another example, the first channel quality indicator $CQI_1$ that is represented by using the $X_3$ bits, the second channel quality indicator $CQI_2$ that is represented by using the $Y_3$ bits, and the precoding indicator PCI that is represented by using the $Z_3$ bits are respectively set at arbitrary $X_3$ bits, arbitrary $Y_3$ bits, and other $Z_3$ bits of the information of the $V_1$ bits; after receiving the information of $V_1$ bits, the base station may parse, according to a communications protocol between the base station and the UE or negotiation with the UE by using signaling, that in the information of the $V_1$ bits, information of the arbitrary $X_3$ bits represents the first channel quality indicator $CQI_1$, information of the arbitrary $Y_3$ bits represents the second channel quality indicator $CQI_2$, and information of the other $Z_3$ bits represents the precoding indicator PCI.

In the foregoing combined feedback of the first channel quality indicator $CQI_1$, the second channel quality indicator $CQI_2$, and the precoding indicator PCI, that the base station identifies the first channel quality indicator $CQI_1$ and the second channel quality indicator $CQI_2$ has another manner, that is, when the first channel quality indicator $CQI_1$ and the second channel quality indicator $CQI_2$ both exist, set the foregoing $X_3=Y_3=4$; when there is only the first channel quality indicator $CQI_1$, $X_3=5$, and there is not the second channel quality indicator $CQI_2$. The following formula 1 may be used to determine whether the second channel quality indicator $CQI_2$ exists, whether the first channel quality indicator $CQI_1$ exists, and a value of the second channel quality indicator $CQI_2$:

$$CQI = \begin{cases} 15 \times CQI_1 + CQI_2 + 31 & \text{(Formula 1)} \\ CQI_s \end{cases}$$

where, CQI is a final value, and $CQI_S$ is a value of the first channel quality indicator $CQI_1$ when there is not the second channel quality indicator $CQI_2$. The UE only needs to report a final value of the CQI to the base station, and the base station may learn values of the first channel quality indicator $CQI_1$ and the second channel quality indicator $CQI_2$, and whether the second channel quality indicator $CQI_2$ is included. For example, the UE detects the DM-Pilot, and obtains that the first channel quality indicator $CQI_1=4$ and the second channel quality indicator $CQI_2=9$; and according to the foregoing formula 1, $CQI=15\times4+9+31=100$. The UE sends the CQI=100 to the base station. After receiving the CQI, because CQI>31, the base station can determine that it is not $CQI_S$, which determines that the CQI fed back by the UE includes the second channel quality indicator $CQI_2$. In addition, because values of the first channel quality indicator $CQI_1$ and the second channel quality indicator $CQI_2$ are both from 0 to 15, a unique group may be obtained, which is that the first channel quality indicator $CQI_1=4$ and the second channel quality indicator $CQI_2=9$. For another example, the UE detects no DM-Pilot, and obtains only the first channel quality indicator $CQI_1$; in this case, a value of the first channel quality indicator $CQI_1$ is from 0 to 31. Assuming that the first channel quality indicator $CQI_1=10$, according to the foregoing formula 1, it may be obtained that CQI=10. After receiving that CQI=10, because CQI≤31, the base station learns that there is not the second channel quality indicator $CQI_2$ in this case, and it may be obtained that the first channel quality indicator $CQI_1=10$.

Manner 12: Time division feedback. That is, after the first channel quality indicator $CQI_1$ is represented by using $X_4$ bits, the second channel quality indicator $CQI_2$ is represented by using $Y_4$ bits, and the precoding indicator PCI is represented by using $Z_4$ bits, information of the $X_4$ bits and information of the $Z_4$ bits are sent to the base station by using the first $K_1$ subframes of $J_1$ HS-DPCCH subframes; and the information of the $X_4$ bits, information of the $Y_4$ bits, and the information of the $Z_4$ bits are sent to the base station by using the last $J_1$-$K_1$ subframes of the $J_1$ HS-DPCCH subframes, or the information of the $X_4$ bits and information of the $Y_4$ bits are sent to the base station by using the last $J_1$-$K_1$ subframes of the $J_1$ HS-DPCCH subframes. In this embodiment, $X_4$, $Y_4$, $Z_4$, $J_1$, and $K_1$ are all natural numbers.

It should be noted that, in the foregoing manner 11 or manner 12, if the detection result of detecting the demodulation pilot by the UE is that the demodulation pilot is not detected, the information of the $Y_4$ bits that is used to represent the second channel quality indicator $CQI_2$, or information of the $Y_3$ bits that is in the information of the $V_1$ bits and is used to represent the second channel quality indicator $CQI_2$ is a special value agreed on with the base station. For example, in the manner 12, assuming that 5 bits (that is, $Y_4$=5) are used to represent the second channel quality indicator $CQI_2$, when the detection result of detecting the demodulation pilot by the UE is that the demodulation pilot is not detected, the information of the $Y_4$ bits that is used to represent the second channel quality indicator $CQI_2$ may be 00000 (binary) or 11111 (binary) agreed on with the base station, that is, 0 (decimal) or 32 (decimal). Similarly, in the manner 11, if 4 bits (that is, $Y_3$=4) in the information of the $V_1$ bits are used to represent the second channel quality indicator $CQI_2$, when the detection result of detecting the demodulation pilot by the UE is that the demodulation pilot is not detected, the information of the $Y_3$ bits that is used to represent the second channel quality indicator $CQI_2$ may be 0000 (binary) or 1111 (binary) agreed on with the base station, that is, 0 (decimal) or 16 (decimal).

Manner 13: Independent feedback. That is, a channel quality indicator that is represented by using M bits, a precoding indicator that is represented by using N bits, and a category indicator are sent to the base station by using an HS-DPCCH subframe, where a value of the category indicator is used to indicate whether the channel quality indicator that is represented by using the M bits is the first channel quality indicator $CQI_1$ or the second channel quality indicator $CQI_2$, or is the first channel quality indicator $CQI_1$, or the first channel quality indicator $CQI_1$ and the second channel quality indicator $CQI_2$. In this embodiment, M and N are both natural numbers.

For example, by using a simplest manner that the category indicator is 1 bit as an example, when the 1-bit category indicator is 0, it indicates that the channel quality indicator represented by using the M bits is the first channel quality indicator $CQI_1$, and when the 1-bit category indicator is 1, it indicates that the channel quality indicator represented by using the M bits is the second channel quality indicator $CQI_2$; or, when the 1-bit category indicator is 0, it indicates that the channel quality indicator represented by using several bits is the first channel quality indicator $CQI_1$, and when the 1-bit category indicator is 1, it indicates that the channel quality indicator represented by using the M bits is the first channel quality indicator $CQI_1$ and the second channel quality indicator $CQI_2$.

When the foregoing category indicator is represented by using 1 bit, the category indicator may be encoded together with the first channel quality indicator $CQI_1$ or the second channel quality indicator $CQI_2$. For example, assuming that the channel quality indicator is represented by using 5 bits, the 5 bits and the 1-bit category indicator may form a 6-bit channel quality indicator part in the HS-DPCCH, where the 5 bits represent the first channel quality indicator $CQI_1$ or the second channel quality indicator $CQI_2$. The category indicator may also be carried on a channel on which the HS-DPCCH and a non HS-DPCCH are sent at the same time; for example, a 1-bit FBI part on a DPCCH or a 1-bit happy bit (Happy Bit) part on an E-DPCCH.

It should be noted that, in the foregoing manner 13, when the value of the category indicator indicates that the channel quality indicator represented by using the M bits is more than one type of channel quality indicator, for example, the value of the category indicator indicates that the channel quality indicator represented by using the M bits is the first channel quality indicator $CQI_1$, the second channel quality indicator $CQI_2$, and a third channel quality indicator $CQI_3$, and the first channel quality indicator $CQI_1$, the second channel quality indicator $CQI_2$, and the third channel quality indicator $CQI_3$ may be sent to the base station in the foregoing manner 11, that is, the manner of combined feedback; therefore, the base station can further distinguish the first channel quality indicator $CQI_1$, the second channel quality indicator $CQI_2$, and the third channel quality indicator $CQI_3$, where a specific scheme is not further described, and refer to the foregoing embodiment of combined feedback.

Manner 14: Scheduled feedback. That is, when the demodulation pilot is not detected, the first channel quality indicator $CQI_1$ is sent to the base station by using an HS-DPCCH subframe; and after the demodulation pilot is detected, according to an agreement with the base station, in a period of time from time $T_3$ to time $T_3'$ during sending an indicator, the second channel quality indicator $CQI_2$ is sent, or the second channel quality indicator $CQI_2$ and the precoding indicator PCI are sent, or the first channel quality indicator $CQI_1$, the second channel quality indicator $CQI_2$, and the precoding indicator PCI are sent, and in a period of time except from time $T_3$ to time $T_3'$ during sending an indicator, the first channel quality indicator $CQI_1$ and the precoding indicator PCI are sent. In this way, if an indicator is received in the period of time from time $T_3$ to time $T_3'$, the base station may learn that the indicator is the second channel quality indicator $CQI_2$, or is the second channel quality indicator $CQI_2$ and the precoding indicator PCI, or is the first channel quality indicator $CQI_1$, the second channel quality indicator $CQI_2$, and the precoding indicator PCI; and if an indicator is received in the period of time except from time $T_3$ to time $T_3'$.

The base station may learn that the indicator is the first channel quality indicator $CQI_1$ and the precoding indicator PCI.

Similarly, in the foregoing manner 14, when more than one type of indicator is sent in the period of time from time $T_3$ to time $T_3'$ or in the period of time except from time $T_3$ to time $T_3'$, for example, the first channel quality indicator $CQI_1$, the second channel quality indicator $CQI_2$, and the precoding indicator PCI are sent in the period of time from time $T_3$ to time $T_3'$ during sending an indicator, the first channel quality indicator $CQI_1$, the second channel quality indicator $CQI_2$, and the precoding indicator PCI may also be sent to the base station in the foregoing manner 11, that is, the manner of combined feedback; therefore, the base station can further distinguish the first channel quality indicator $CQI_1$, the second channel quality indicator $CQI_2$, and the precoding indicator PCI, where a specific scheme is not further described, and refer to the foregoing embodiment of combined feedback.

Manner 15: Code division feedback. That is, the first channel quality indicator $CQI_1$ and the precoding indicator PCI are spread to a first orthogonal variable spreading factor code, the second channel quality indicator $CQI_2$ is spread to a second orthogonal variable spreading factor code, and the first channel quality indicator $CQI_1$, the second channel quality indicator $CQI_2$, and the precoding indicator PCI are sent to the base station by using an HS-DPCCH subframe after being spreaded. Because two OVSF codes are completely orthogonal, interference is not generated when the two OVSF codes are sent at the same time. When receiving the two spreading codes, the base station may obtain the first channel quality indicator $CQI_1$ and the second channel quality indicator $CQI_2$ by despreading.

In the case that the multiple-antenna mode is the dual-antenna mode, the pilot sent by the base station in step S201 may include a beamforming pilot (BeamForming Pilot, BF-Pilot), the primary pilot sent on the primary common pilot channel, and the secondary pilot sent on the secondary common pilot channel. In this embodiment of the present invention, the beamforming pilot is a special pilot that is transmitted by the base station by using low power, and beamwidth of the beamforming pilot is narrower than beamwidth of the primary pilot sent on the primary common pilot channel. Optionally, a beam direction of the beamforming pilot may be time-varying. The acquiring a precoding indicator PCI and a first channel quality indicator $CQI_1$ based on detection of a pilot that is sent by a base station includes: acquiring the precoding indicator PCI based on detection of the primary pilot and the secondary pilot that are sent by the base station, and acquiring the first channel quality indicator $CQI_1$ based on detection of the primary pilot and the secondary pilot that are sent by the base station.

When the pilot sent by the base station includes the beamforming pilot, the primary pilot sent on the primary common pilot channel, and the secondary pilot sent on the secondary common pilot channel, the method shown in FIG. 2 further includes: acquiring a third channel quality indicator $CQI_3$ based on detection of the beamforming pilot; and sending the third channel quality indicator $CQI_3$ to the base station in a manner in which the base station can distinguish the third channel quality indicator $CQI_3$. In this embodiment of the present invention, the sending the precoding indicator PCI and/or the first channel quality indicator $CQI_1$ and/or the second channel quality indicator $CQI_2$ to the base station in a manner in which the base station can distinguish the precoding indicator PCI, the first channel quality indicator $CQI_1$, and/or the second channel quality indicator $CQI_2$ may be any one of the following manner 16 to manner 20:

Manner 16: Combined feedback. That is, the first channel quality indicator $CQI_1$ that is represented by using $X_5$ bits, the second channel quality indicator $CQI_2$ that is represented by using $Y_5$ bits, the third channel quality indicator $CQI_3$ that is represented by $Z_5$ bits, and the precoding indicator PCI that is represented by using $L_1$ bits are set in information of $V_2$ bits; the information of the $V_2$ bits is sent to the base station by using one HS-DPCCH subframe, where, $V_2$, $X_5$, $Y_5$, $Z_5$, and $L_1$ are all natural numbers; $V_2$ may be equal to a sum of $X_5$, $Y_5$, $Z_5$, and $L_1$, that is, $V_2=X_5+Y_5+Z_5+L_1$; when a reserved bit needs to be introduced, $V_2$ may also be greater than the sum of $X_5$, $Y_5$, $Z_5$, and $L_1$; if a compression scheme is introduced during encoding, $V_2$ may also be less than the sum of $X_5$, $Y_5$, $Z_5$, and $L_1$; and a relationship between $V_2$, $X_5$, $Y_5$, $Z_5$, and $L_1$ is not limited by this embodiment of the present invention. After receiving the information of the $V_2$ bits, the base station may parse, according to a communications protocol between the base station and the UE or negotiation with the UE by using signaling, the first channel quality indicator $CQI_1$ that is represented by using the $X_5$ bits, the second channel quality indicator $CQI_2$ that is represented by using the $Y_5$ bits, the third channel quality indicator $CQI_3$ that is represented by using the $Z_5$ bits, and the precoding indicator PCI that is represented by using the $L_1$ bits. For example, the first channel quality indicator $CQI_1$ that is represented by using the $X_5$ bits, the second channel quality indicator $CQI_2$ that is represented by using the $Y_5$ bits, the third channel quality indicator $CQI_3$ that is represented by using the $Z_5$ bits, and the precoding indicator PCI that is represented by using the $L_1$ bits are respectively set at the first $X_5$ bits, middle $Y_5$ bits, middle $Z_5$ bits, and the last $L_1$ bits of the information of the $V_2$ bits; after receiving the information of the $V_2$ bits, the base station may parse, according to a communications protocol between the base station and the UE or negotiation with the UE by using signaling, that in the information of the $V_2$ bits, information of the first $X_5$ bits represents the first channel quality indicator $CQI_1$, information of the middle $Y_5$ bits represents the second channel quality indicator $CQI_2$, information of the middle $Z_5$ bits represents the third channel quality indicator $CQI_3$, and information of the last $L_1$ bits represents the precoding indicator PCI. For another example, the first channel quality indicator $CQI_1$ that is represented by using the $X_5$ bits, the second channel quality indicator $CQI_2$ that is represented by using the $Y_5$ bits, the third channel quality indicator $CQI_3$ that is represented by using the $Z_5$ bits, and the precoding indicator PCI that is represented by using the $L_1$ bits are respectively set at arbitrary $X_5$ bits, arbitrary $Y_5$ bits, arbitrary $Z_5$ bits, and other $L_1$ bits of the information of the $V_2$ bits; after receiving the information of the $V_2$ bits, the base station may parse, according to a communications protocol between the base station and the UE or negotiation with the UE by using signaling, that in the information of the $V_2$ bits, information of the arbitrary $X_5$ bits represents the first channel quality indicator $CQI_1$, information of the arbitrary $Y_5$ bits represents the second channel quality indicator $CQI_2$, information of the arbitrary $Z_5$ bits represents the third channel quality indicator $CQI_3$, and information of the other $L_1$ bits represents the precoding indicator PCI.

Manner 17: Time division feedback. That is, after the first channel quality indicator $CQI_1$ is represented by using $X_6$ bits, the second channel quality indicator $CQI_2$ is represented by using $Y_6$ bits, the third channel quality indicator $CQI_3$ is represented by using $Z_6$ bits, and the precoding indicator PCI is represented by using $L_2$ bits, information of the $X_6$ bits, information of the $Z_6$ bits, and information of the $L_2$ bits are sent to the base station by using the first $K_2$ subframes of $J_2$ HS-DPCCH subframes, and the information of the $X_6$ bits, information of the $Y_6$ bits, and the information of the $Z_6$ bits, or, the information of the $X_6$ bits, information of the $Y_6$ bits, the information of the $Z_6$ bits, and the information of the $L_2$ bits are sent to the base station by using the last $J_2$-$K_2$ subframes of the $J_2$ HS-DPCCH subframes. In this embodiment, $X_6$, $Y_6$, $Z_6$, and $L_2$ are all natural numbers.

Manner 18: Mixed feedback. That is, a channel quality indicator that is represented by using R bits, a precoding indicator that is represented by using S bits, and a category indicator are sent to the base station by using an HS-DPCCH subframe, where a value of the category indicator is used to indicate whether the channel quality indicator that is represented by using the R bits and/or the precoding indicator that is represented by using the S bits is the first channel quality indicator $CQI_1$, the third channel quality indicator $CQI_3$, and the precoding indicator PCI, or is the second channel quality indicator $CQI_2$, or is the first channel quality indicator $CQI_1$, the second channel quality indicator $CQI_2$, and the third channel quality indicator $CQI_3$, or is the second channel quality indicator $CQI_2$ and the precoding indicator PCI, or is the first channel quality indicator $CQI_1$, the second channel quality indicator $CQI_2$, the third channel quality indicator $CQI_3$, and the precoding indicator PCI. In this embodiment, R and S are both natural numbers.

It should be noted that, in the foregoing manner 18, when the value of the category indicator indicates that the channel quality indicator represented by using the R bits and/or the precoding indicator represented by using the S bits is more than one type of indicator, for example, the value of the category indicator indicates that the channel quality indicator represented by using the R bits and the precoding indicator represented by using the S bits are the first channel quality indicator $CQI_1$, the third channel quality indicator $CQI_3$, and the precoding indicator PCI, the first channel quality indicator $CQI_1$, the third channel quality indicator $CQI_3$, and the precoding indicator PCI may be sent to the base station in the foregoing manner 16, that is, the manner of combined feedback; therefore, the base station can further distinguish the first channel quality indicator $CQI_1$, the third channel quality indicator $CQI_3$, and the precoding indicator PCI, where a specific scheme is not further described, and refer to the foregoing embodiment of combined feedback.

Manner 19: Scheduled feedback. That is, when the demodulation pilot is not detected, the first channel quality indicator $CQI_1$ and the third channel quality indicator $CQI_3$ are sent to the base station by using an HS-DPCCH subframe; and after the demodulation pilot is detected, according to an agreement with the base station, in a period of time from time $T_4$ to time $T_4'$ during sending an indicator, the second channel quality indicator $CQI_2$ is sent, or the first channel quality indicator $CQI_1$, the second channel quality indicator $CQI_2$, and the third channel quality indicator $CQI_3$ are sent, or the second channel quality indicator $CQI_2$ and the precoding indicator PCI are sent, or the first channel quality indicator $CQI_1$, the second channel quality indicator $CQI_2$, the third channel quality indicator $CQI_3$, and the precoding indicator PCI are sent, and in a period of time except from time $T_4$ to time $T_4'$ during sending an indicator, the first channel quality indicator $CQI_1$, the third channel quality indicator $CQI_3$, and the precoding indicator PCI are sent.

In this way, if an indicator is received in the period of time from time $T_4$ to time $T_4'$, the base station may learn that the indicator is the second channel quality indicator $CQI_2$, or is the first channel quality indicator $CQI_1$, the second channel quality indicator $CQI_2$, and the third channel quality indicator $CQI_3$, or is the second channel quality indicator $CQI_2$ and the precoding indicator PCI, or is the first channel quality indicator $CQI_1$, the second channel quality indicator $CQI_2$, the third channel quality indicator $CQI_3$, and the precoding indicator PCI; and if an indicator is received in the period of time except from time $T_4$ to time $T_4'$, the base station may learn that the channel quality indicator is the first channel quality indicator $CQI_1$, the third channel quality indicator $CQI_3$, and the precoding indicator PCI.

Similarly, in the foregoing manner 19, when more than one type of channel quality indicator is sent in the period of time from time $T_4$ to time $T_4'$ or in the period of time except from time $T_4$ to time $T_4'$, for example, the first channel quality indicator $CQI_1$, the second channel quality indicator $CQI_2$, the third channel quality indicator $CQI_3$, and the precoding indicator PCI are sent in the period of time from time $T_4$ to time $T_4'$ during sending an indicator, the first channel quality indicator $CQI_1$, the second channel quality indicator $CQI_2$, the third channel quality indicator $CQI_3$, and the precoding indicator PCI may also be sent to the base station in the foregoing manner 16, that is, the manner of combined feedback; therefore, the base station can further distinguish the first channel quality indicator $CQI_1$, the second channel quality indicator $CQI_2$, the third channel quality indicator $CQI_3$, and the precoding indicator PCI, where a specific scheme is not further described, and refer to the foregoing embodiment of combined feedback.

Manner 20: Code division feedback. That is, after the first channel quality indicator $CQI_1$, the third channel quality indicator $CQI_3$, and the precoding indicator PCI are spread to a first orthogonal variable spreading factor code, and the second channel quality indicator $CQI_2$ is spread to a second orthogonal variable spreading factor code, the first channel quality indicator $CQI_1$, the second channel quality indicator $CQI_2$, the third channel quality indicator $CQI_3$, and the precoding indicator PCI are sent to the base station by using an HS-DPCCH subframe. Because two OVSF codes are completely orthogonal, interference is not generated when the two OVSF codes are sent at the same time. When receiving the two spreading codes, the base station may obtain the first channel quality indicator $CQI_1$ and the second channel quality indicator $CQI_2$ by despreading.

Figure 3:
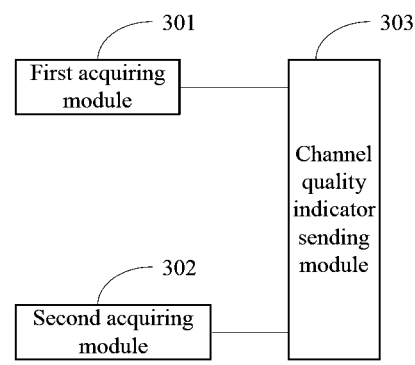
FIG. 3 is a schematic structural diagram of a channel quality indicator feedback apparatus according to an embodiment of the present invention.

Referring to FIG. 3, FIG. 3 is a schematic structural diagram of a channel quality indicator feedback apparatus according to an embodiment of the present invention. For ease of description, only parts related to this embodiment of the present invention are shown. The channel quality indicator feedback apparatus shown in FIG. 3 may be a user equipment in a WCDMA system or a function unit/module in the user equipment, which includes a first acquiring module 301, a second acquiring module 302, and a channel quality indicator sending module 303, where:

the first acquiring module 301 is configured to acquire a first channel quality indicator $CQI_1$ based on detection of a pilot that is sent by a base station;

the second acquiring module 302 is configured to acquire a second channel quality indicator $CQI_2$ based on a result of detection of a demodulation pilot, where the result of the detection of the demodulation pilot includes that the demodulation pilot is not detected, and the demodulation pilot is used to demodulate a data channel during estimating a channel; and the channel quality indicator sending module 303 is configured to send the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$.

It should be noted that, in an implementation manner of the foregoing channel quality indicator feedback apparatus, division of all function modules is merely an example, and in an actual application, according to a requirement, for example, a configuration requirement of corresponding hardware or convenience consideration for implementing software, the foregoing functions may be allocated to different function modules for implementation, which means that an internal structure of the channel quality indicator feedback apparatus is divided into different function modules, to implement all or some of functions described above. In addition, in an actual application, corresponding function modules in the embodiment may be implemented by corresponding hardware, or may be implemented by corresponding software that is executed by corresponding hardware. For example, the first acquiring module described above may be hardware that executes the foregoing acquiring a first channel quality indicator $CQI_1$ based on detection of a pilot that is sent by a base station, for example, a first acquirer, or may be a common processor or other hardware devices that can execute a corresponding computer program to implement the foregoing function. For another example, the channel quality indicator sending module described above may be hardware that has a function of executing the foregoing sending the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$, for example, a channel quality indicator sender, or may be a common processor or other hardware devices that can execute a corresponding computer program to implement the foregoing function. (Each embodiment provided by the specification may use the foregoing description principle.)

Figure 4:
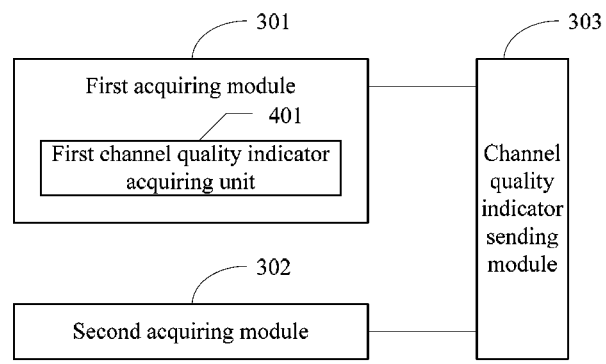
FIG. 4 is a schematic structural diagram of a channel quality indicator feedback apparatus according to another embodiment of the present invention.

In the channel quality indicator feedback apparatus shown in FIG. 3, the pilot sent by the base station includes a primary pilot sent on a primary common pilot channel, and the first acquiring module 301 may include a first channel quality indicator acquiring unit 401. As shown in FIG. 4, FIG. 4 shows a channel quality indicator feedback apparatus according to another embodiment of the present invention. The first channel quality indicator acquiring unit 401 is configured to acquire a first channel quality indicator $CQI_1$ based on detection of the primary pilot that is sent by the base station.

Figure 5A:
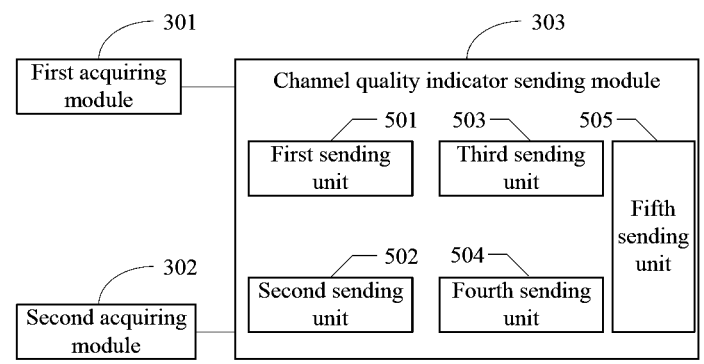
FIG. 5a is a schematic structural diagram of a channel quality indicator feedback apparatus according to another embodiment of the present invention.
Figure 5B:
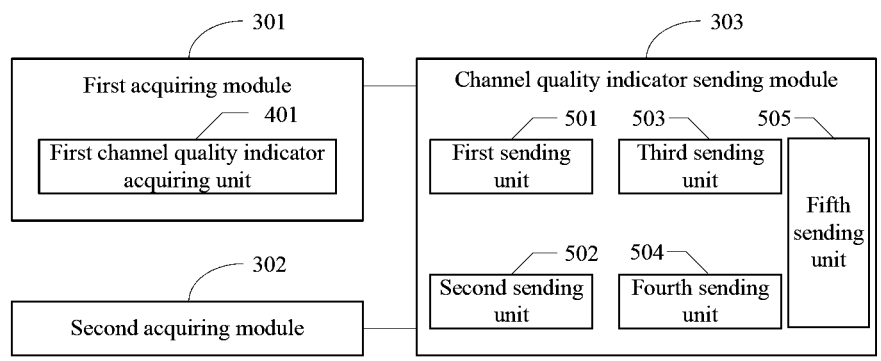
FIG. 5b is a schematic structural diagram of a channel quality indicator feedback apparatus according to another embodiment of the present invention.

The channel quality indicator sending module 303 shown in FIG. 3 or FIG. 4 may include a first sending unit 501, a second sending unit 502, a third sending unit 503, a fourth sending unit 504, or a fifth sending unit 505. As shown in FIG. 5a or FIG. 5b, FIG. 5a or FIG. 5b shows a channel quality indicator feedback apparatus according to another embodiment of the present invention, where:

the first sending unit 501 is configured to set, in information of $W_1$ bits, the first channel quality indicator $CQI_1$ that is represented by using $N_1$ bits and the second channel quality indicator $CQI_2$ that is represented by using $M_1$ bits, and send the information of the $W_1$ bits to the base station by using a high speed dedicated physical control channel HS-DPCCH subframe, where, $W_1$, $N_1$, and $M_1$ are all natural numbers; $W_1$ may be equal to a sum of $N_1$ and $M_1$; when a reserved bit needs to be introduced, $W_1$ may also be greater than the sum of $N_1$ and $M_1$; if a compression scheme is introduced during encoding, $W_1$ may also be less than the sum of $N_1$ and $M_1$; and a relationship between $W_1$, $N_1$, and $M_1$ is not limited by this embodiment;

the second sending unit 502 is configured to, after the first channel quality indicator $CQI_1$ is represented by using $N_2$ bits, and the second channel quality indicator $CQI_2$ is represented by using $M_2$ bits, send information of the $N_2$ bits to the base station by using the first $Q_1$ subframes of $P_1$ HS-DPCCH subframes, and send information of the $M_2$ bits to the base station by using the last $P_1$-$Q_1$ subframes of the $P_1$ HS-DPCCH subframes, where in this embodiment, $N_2$, $M_2$, $P_1$, and $Q_1$ are all natural numbers;

the third sending unit 503 is configured to send a channel quality indicator that is represented by using several bits and a category indicator to the base station by using an HS-DPCCH subframe, where a value of the category indicator is used to indicate whether the channel quality indicator that is represented by using several bits is the first channel quality indicator $CQI_1$ or the second channel quality indicator $CQI_2$, or is the first channel quality indicator $CQI_1$, or the first channel quality indicator $CQI_1$ and the second channel quality indicator $CQI_2$;

the fourth sending unit 504 is configured to, when the demodulation pilot is not detected, send the first channel quality indicator $CQI_1$ to the base station by using an HS-DPCCH subframe; and after the demodulation pilot is detected, according to an agreement with the base station, in a period of time from time $T_1$ to time $T_1'$ during sending a channel quality indicator, send the second channel quality indicator $CQI_2$, or send the first channel quality indicator $CQI_1$ and the second channel quality indicator $CQI_2$, and in a period of time except from time $T_1$ to time $T_1'$ during sending a channel quality indicator, send the first channel quality indicator $CQI_1$; and the fifth sending unit 505 is configured to spread the first channel quality indicator $CQI_1$ to a first orthogonal variable spreading factor code, spread the second channel quality indicator $CQI_2$ to a second orthogonal variable spreading factor code, and send the first channel quality indicator $CQI_1$ and the second channel quality indicator $CQI_2$ to the base station by using an HS-DPCCH subframe after being spreaded.

In the channel quality indicator feedback apparatus shown in FIG. 5a or FIG. 5b, when the result of the detection of the demodulation pilot is that the demodulation pilot is not detected, the information of the $M_2$ bits that is used to represent the second channel quality indicator $CQI_2$, or information of the $M_1$ bits that is in the information of the $W_1$ bits and is used to represent the second channel quality indicator $CQI_2$ is a value agreed on with the base station.

Figure 6:
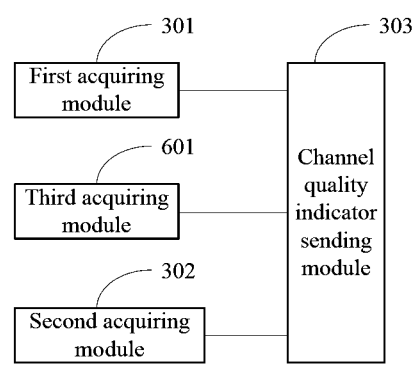
FIG. 6 is a schematic structural diagram of a channel quality indicator feedback apparatus according to another embodiment of the present invention.

In the channel quality indicator feedback apparatus shown in FIG. 3, the pilot sent by the base station includes a beamforming pilot and a primary pilot that is sent on a primary common pilot channel, and the apparatus further includes a third acquiring module 601. As shown in FIG. 6, FIG. 6 shows a channel quality indicator feedback apparatus according to another embodiment of the present invention, where:

the third acquiring module 601 is configured to acquire a third channel quality indicator $CQI_3$ based on detection of the beamforming pilot; and the channel quality indicator sending module 303 is further configured to send the third channel quality indicator $CQI_3$ to the base station in a manner in which the base station can distinguish the third channel quality indicator $CQI_3$.

In the channel quality indicator feedback apparatus shown in FIG. 6, the beamforming pilot is sent by the base station, beamwidth of the beamforming pilot is narrower than beamwidth of the primary pilot, and a beam direction of the beamforming pilot is time-varying.

Figure 7:
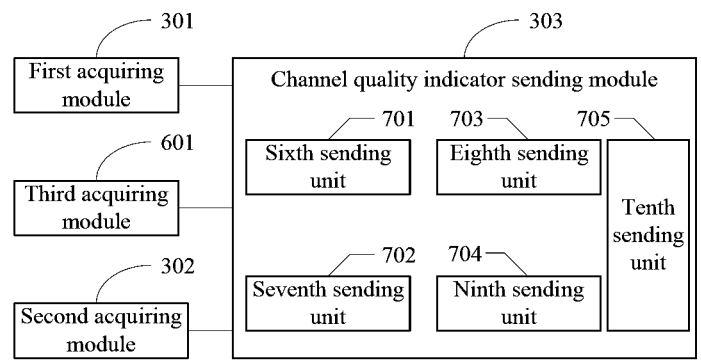
FIG. 7 is a schematic structural diagram of a channel quality indicator feedback apparatus according to another embodiment of the present invention.

The channel quality indicator sending module 303 shown in FIG. 6 may include a sixth sending unit 701, a seventh sending unit 702, an eighth sending unit 703, a ninth sending unit 704, or a tenth sending unit 705. As shown in FIG. 7, FIG. 7 shows a channel quality indicator feedback apparatus according to another embodiment of the present invention, where:

the sixth sending unit 701 is configured to set, in information of $W_2$ bits, the first channel quality indicator $CQI_1$ that is represented by using $X_1$ bits, the second channel quality indicator $CQI_2$ that is represented by using $Y_1$ bits, and the third channel quality indicator $CQI_3$ that is represented by using $Z_1$ bits, and send the information of the $W_2$ bits to the base station by using one HS-DPCCH subframe or two successive HS-DPCCH subframes, where, $W_2$, $X_1$, $Y_1$, and $Z_1$ are all natural numbers; $W_2$ may be equal to a sum of $X_1$, $Y_1$, and $Z_1$, that is, $W_2=X_1+Y_1+Z_1$; when a reserved bit needs to be introduced, $W_2$ may also be greater than the sum of $X_1$, $Y_1$, and $Z_1$; if a compression scheme is introduced during encoding, $W_2$ may also be less than the sum of $X_1$, $Y_1$, and $Z_1$; and a relationship between $W_2$, $X_1$, $Y_1$, and $Z_1$ is not limited by the embodiment;

the seventh sending unit 702 is configured to, after the first channel quality indicator $CQI_1$ is represented by using $X_2$ bits, the second channel quality indicator $CQI_2$ is represented by using $Y_2$ bits, and the third channel quality indicator $CQI_3$ is represented by using $Z_2$ bits, send information of the $X_2$ bits and information of the $Z_2$ bits to the base station by using the first $Q_2$ subframes of $P_2$ HS-DPCCH subframes, and send the information of the $X_2$ bits, information of the $Y_2$ bits, and the information of the $Z_2$ bits to the base station by using the last $P_2$-$Q_2$ subframes of the $P_2$ HS-DPCCH subframes, where in this embodiment, $X_2$, $Y_2$, $Z_2$, $P_2$, and $Q_2$ are all natural numbers;

the eighth sending unit 703 is configured to send a channel quality indicator that is represented by using X bits and a category indicator to the base station by using an HS-DPCCH subframe, where a value of the category indicator is used to indicate whether the channel quality indicator that is represented by using the X bits is the first channel quality indicator $CQI_1$ and the third channel quality indicator $CQI_3$, or is the second channel quality indicator $CQI_2$, or is the first channel quality indicator $CQI_1$, the second channel quality indicator $CQI_2$, and the third channel quality indicator $CQI_3$, and in this embodiment, X is a natural number;

the ninth sending unit 704 is configured to, when the demodulation pilot is not detected, send the first channel quality indicator $CQI_1$ and the second channel quality indicator $CQI_2$ to the base station by using an HS-DPCCH subframe; and after the demodulation pilot is detected, according to an agreement with the base station, in a period of time from time $T_2$ to time $T_2'$ during sending a channel quality indicator, send the second channel quality indicator $CQI_2$, or send the first channel quality indicator $CQI_1$, the second channel quality indicator $CQI_2$, and the third channel quality indicator $CQI_3$, and in a period of time except from time $T_2$ to time $T_2'$ during sending a channel quality indicator, send the first channel quality indicator $CQI_1$ and the third channel quality indicator $CQI_3$; and the tenth sending unit 705 is configured to spread the first channel quality indicator $CQI_1$ and the third channel quality indicator $CQI_3$ to a first orthogonal variable spreading factor code, spread the second channel quality indicator $CQI_2$ to a second orthogonal variable spreading factor code, and send the first channel quality indicator $CQI_1$, the second channel quality indicator $CQI_2$, and the third channel quality indicator $CQI_3$ to the base station by using an HS-DPCCH subframe after being spreaded.

In the channel quality indicator feedback apparatus shown in FIG. 7, when the result of the detection of the demodulation pilot is that the demodulation pilot is not detected, the information of the $Y_2$ bits that is used to represent the second channel quality indicator $CQI_2$, or information of the $Y_1$ bits that is in the information of the $W_2$ bits and is used to represent the second channel quality indicator $CQI_2$ is a value agreed on with the base station.

Figure 8:
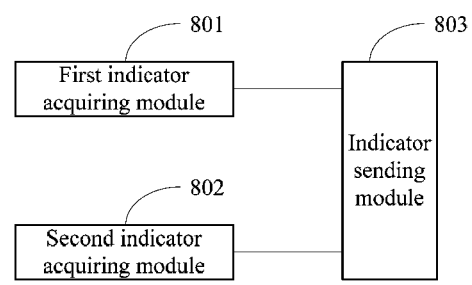
FIG. 8 is a schematic structural diagram of a channel quality indicator feedback apparatus according to another embodiment of the present invention.

Referring to FIG. 8, FIG. 8 is a schematic structural diagram of a channel quality indicator feedback apparatus according to another embodiment of the present invention. For ease of description, only parts related to this embodiment of the present invention are shown. The channel quality indicator feedback apparatus shown in FIG. 8 may be a user equipment in a WCDMA system or a function unit/module in the user equipment, which includes a first indicator acquiring module 801, a second indicator acquiring module 802, and an indicator sending module 803, where:

the first indicator acquiring module 801 is configured to acquire a precoding indicator PCI and a first channel quality indicator $CQI_1$ based on detection of a pilot that is sent by a base station;

the second indicator acquiring module 802 is configured to acquire a second channel quality indicator $CQI_2$ based on a result of detection of a demodulation pilot, where the result of the detection of the demodulation pilot includes that the demodulation pilot is not detected, and the demodulation pilot is used to demodulate a data channel during estimating a channel; and the indicator sending module 803 is configured to send the precoding indicator PCI and/or the first channel quality indicator $CQI_1$ and/or the second channel quality indicator $CQI_2$ to the base station in a manner in which the base station can distinguish the precoding indicator PCI and/or the first channel quality indicator $CQI_1$ and/or the second channel quality indicator $CQI_2$.

Figure 9:
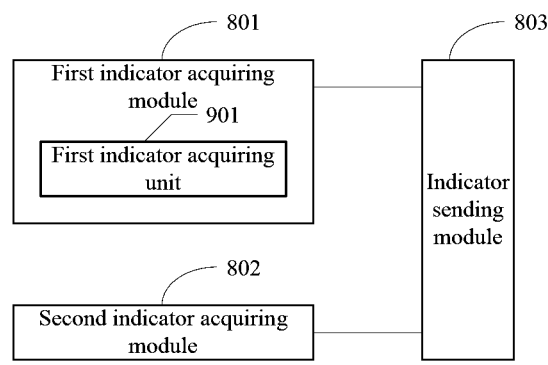
FIG. 9 is a schematic structural diagram of a channel quality indicator feedback apparatus according to another embodiment of the present invention.

In the channel quality indicator feedback apparatus shown in FIG. 8, the pilot sent by the base station includes a primary pilot sent on a primary common pilot channel and a secondary pilot sent on a secondary common pilot channel, and the first indicator acquiring module 801 includes a first indicator acquiring unit 901. As shown in FIG. 9, FIG. 9 shows a channel quality indicator feedback apparatus according to another embodiment of the present invention. The first indicator acquiring unit 901 is configured to acquire the precoding indicator PCI based on detection of the primary pilot and the secondary pilot that are sent by the base station, and acquire the first channel quality indicator $CQI_1$ based on detection of the primary pilot and the secondary pilot that are sent by the base station.

Figure 10A:
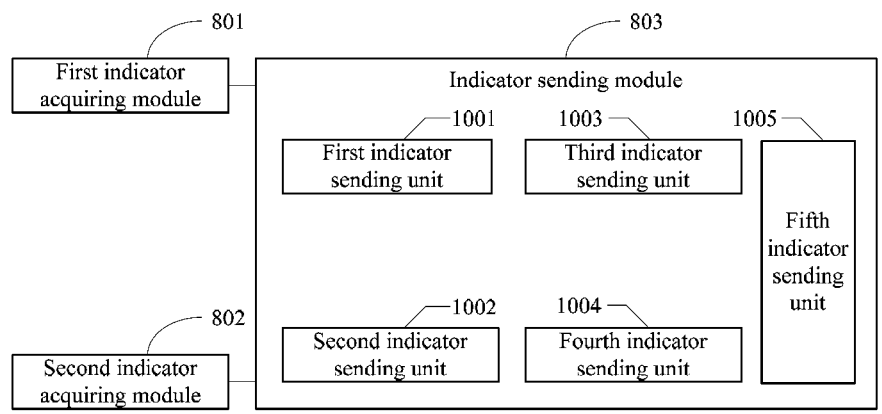
FIG. 10a is a schematic structural diagram of a channel quality indicator feedback apparatus according to another embodiment of the present invention.
Figure 10B:
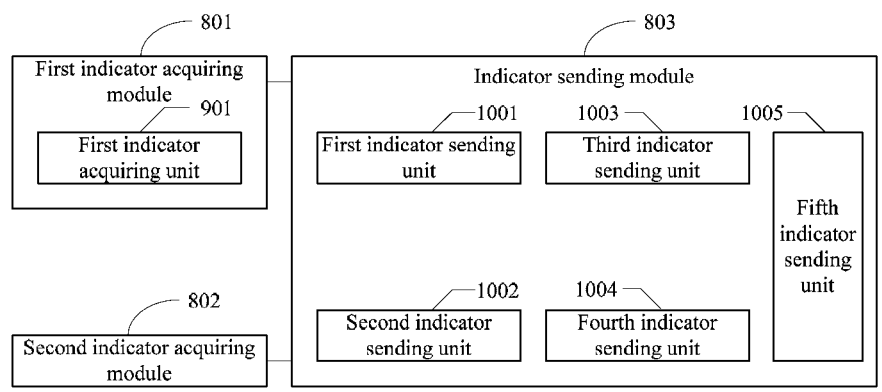
FIG. 10b is a schematic structural diagram of a channel quality indicator feedback apparatus according to another embodiment of the present invention.

The indicator sending module 803 shown in FIG. 8 or FIG. 9 may include a first indicator sending unit 1001, a second indicator sending unit 1002, a third indicator sending unit 1003, a fourth indicator sending unit 1004, or a fifth indicator sending unit 1005. As shown in FIG. 10a or FIG. 10b, FIG. 10a or FIG. 10b shows a channel quality indicator feedback apparatus according to another embodiment of the present invention, where:

the first indicator sending unit 1001 is configured to set, in information of $V_1$ bits, the first channel quality indicator $CQI_1$ that is represented by using $X_3$ bits, the second channel quality indicator $CQI_2$ that is represented by using $Y_3$ bits, and the precoding indicator PCI that is represented by using $Z_3$ bits, and send the information of the $V_1$ bits to the base station by using a high speed dedicated physical control channel HS-DPCCH subframe, where, $V_1$, $X_3$, $Y_3$, and $Z_3$ are all natural numbers; $V_1$ may be equal to a sum of $X_3$, $Y_3$, and $Z_3$; when a reserved bit needs to be introduced, $V_1$ may also be greater than the sum of $X_3$, $Y_3$, and $Z_3$; if a compression scheme is introduced during encoding, $V_1$ may also be less than the sum of $X_3$, $Y_3$, and $Z_3$; and a relationship between $V_1$, $X_3$, $Y_3$, and $Z_3$ is not limited by this embodiment of the present invention;

the second indicator sending unit 1002 is configured to, after the first channel quality indicator $CQI_1$ is represented by using $X_4$ bits, the second channel quality indicator $CQI_2$ is represented by using $Y_4$ bits, and the precoding indicator PCI is represented by using $Z_4$ bits, send information of the $X_4$ bits and information of the $Z_4$ bits to the base station by using the first $K_1$ subframes of $J_1$ HS-DPCCH subframes; and send the information of the $X_4$ bits, information of the $Y_4$ bits, and the information of the $Z_4$ bits to the base station by using the last $J_1$-$K_1$ subframes of the $J_1$ HS-DPCCH subframes, or send the information of the $X_4$ bits and information of the $Y_4$ bits to the base station by using the last $J_1$-$K_1$ subframes of the $J_1$ HS-DPCCH subframes, where in this embodiment, $X_4$, $Y_4$, $Z_4$, $J_1$, and $K_1$ are all natural numbers;

the third indicator sending unit 1003 is configured to send a channel quality indicator that is represented by using M bits, a precoding indicator that is represented by using N bits, and a category indicator to the base station by using an HS-DPCCH subframe, where a value of the category indicator is used to indicate whether the channel quality indicator that is represented by using the M bits is the first channel quality indicator $CQI_1$ or the second channel quality indicator $CQI_2$, or is the first channel quality indicator $CQI_1$, or the first channel quality indicator $CQI_1$ and the second channel quality indicator $CQI_2$, and in this embodiment, M and N are both natural numbers;

the fourth indicator sending unit 1004 is configured to, when the demodulation pilot is not detected, send the first channel quality indicator $CQI_1$ to the base station by using an HS-DPCCH subframe; and after the demodulation pilot is detected, according to an agreement with the base station, in a period of time from time $T_3$ to time $T_3'$ during sending an indicator, send the second channel quality indicator $CQI_2$, or send the second channel quality indicator $CQI_2$ and the precoding indicator PCI, or send the first channel quality indicator $CQI_1$, the second channel quality indicator $CQI_2$, and the precoding indicator PCI, and in a period of time except from time $T_3$ to time $T_3'$ during sending an indicator, send the first channel quality indicator $CQI_1$ and the precoding indicator PCI; and the fifth indicator sending unit 1005 is configured to spread the first channel quality indicator $CQI_1$ and the precoding indicator PCI to a first orthogonal variable spreading factor code, spread the second channel quality indicator $CQI_2$ to a second orthogonal variable spreading factor code, and send the first channel quality indicator $CQI_1$, the second channel quality indicator $CQI_2$, and the precoding indicator PCI to the base station by using an HS-DPCCH subframe after being spreaded.

In the channel quality indicator feedback apparatus shown in FIG. 10a or FIG. 10b, when the result of the detection of the demodulation pilot is that the demodulation pilot is not detected, the information of the $Y_4$ bits that is used to represent the second channel quality indicator $CQI_2$, or information of the $Y_3$ bits that is in the information of the $V_1$ bits and is used to represent the second channel quality indicator $CQI_2$ is a value agreed on with the base station.

Figure 11:
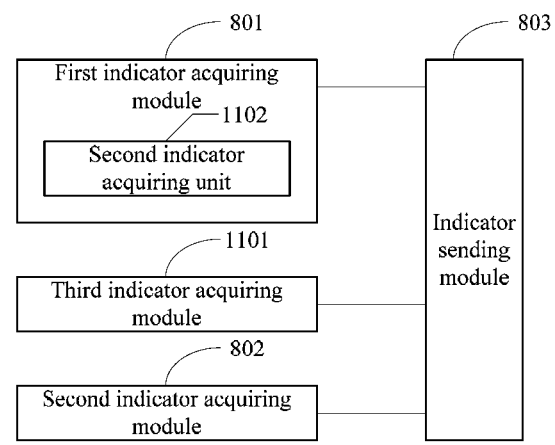
FIG. 11 is a schematic structural diagram of a channel quality indicator feedback apparatus according to another embodiment of the present invention.

In the channel quality indicator feedback apparatus shown in FIG. 8, the pilot sent by the base station includes a beamforming pilot, a primary pilot sent on a primary common pilot channel, and a secondary pilot sent on a secondary common pilot channel; the apparatus further includes a third indicator acquiring module 1101, and the first indicator acquiring module 801 includes a second indicator acquiring unit 1102. As shown in FIG. 11, FIG. 11 shows a channel quality indicator feedback apparatus according to another embodiment of the present invention, where:

the third indicator acquiring module 1101 is configured to acquire a third channel quality indicator $CQI_3$ based on detection of the beamforming pilot; and the indicator sending module 803 is further configured to send the third channel quality indicator $CQI_3$ to the base station in a manner in which the base station can distinguish the third channel quality indicator $CQI_3$.

In the channel quality indicator feedback apparatus shown in FIG. 11, the beamforming pilot is sent by the base station, beamwidth of the beamforming pilot is narrower than beamwidth of the primary pilot, and a beam direction of the beamforming pilot is time-varying.

Figure 12:
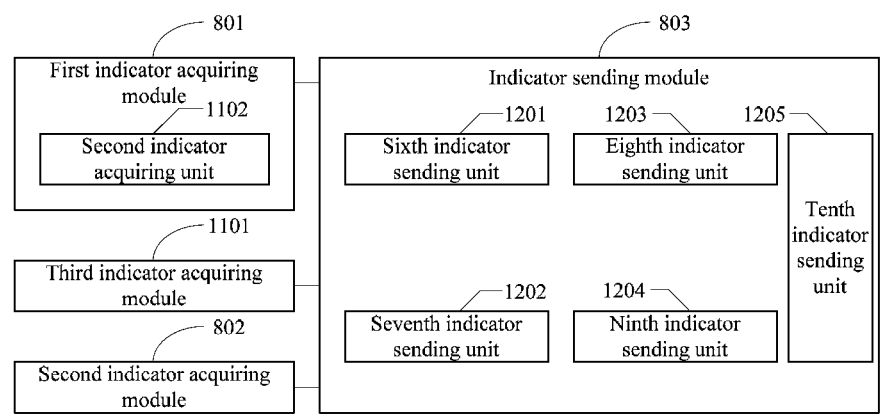
FIG. 12 is a schematic structural diagram of a channel quality indicator feedback apparatus according to another embodiment of the present invention.

The indicator sending module 803 shown in FIG. 11 may include a sixth indicator sending unit 1201, a seventh indicator sending unit 1202, an eighth indicator sending unit 1203, a ninth indicator sending unit 1204, or a tenth indicator sending unit 1205. As shown in FIG. 12, FIG. 12 shows a channel quality indicator feedback apparatus according to another embodiment of the present invention, where:

the sixth indicator sending unit 1201 is configured to set, in information of $V_2$ bits, the first channel quality indicator $CQI_1$ that is represented by using $X_5$ bits, the second channel quality indicator $CQI_2$ that is represented by using $Y_5$ bits, the third channel quality indicator $CQI_3$ that is represented by using $Z_5$ bits, and the precoding indicator PCI that is represented by using $L_1$ bits, and send the information of the $V_2$ bits to the base station by using one HS-DPCCH subframe, where, $V_2$, $X_5$, $Y_5$, $Z_5$, and $L_1$ are all natural numbers; $V_2$ may be equal to a sum of $X_5$, $Y_5$, $Z_5$, and $L_1$; when a reserved bit needs to be introduced, $V_2$ may also be greater than the sum of $X_5$, $Y_5$, $Z_5$, and $L_1$; if a compression scheme is introduced during encoding, $V_2$ may also be less than the sum of $X_5$, $Y_5$, $Z_5$, and $L_1$; and therefore a relationship between $V_2$, $X_5$, $Y_5$, $Z_5$, and $L_1$ is not limited by this embodiment of the present invention;

the seventh indicator sending unit 1202 is configured to, after the first channel quality indicator $CQI_1$ is represented by using $X_6$ bits, the second channel quality indicator $CQI_2$ is represented by using $Y_6$ bits, the third channel quality indicator $CQI_3$ is represented by using $Z_6$ bits, and the precoding indicator PCI is represented by using $L_2$ bits, send information of the $X_6$ bits, information of the $Z_6$ bits, and information of the $L_2$ bits to the base station by using the first $K_2$ subframes of $J_2$ HS-DPCCH subframes, and send the information of the $X_6$ bits, information of the $Y_6$ bits, and the information of the $Z_6$ bits, or, the information of the $X_6$ bits, information of the $Y_6$ bits, the information of the $Z_6$ bits, and the information of the $L_2$ bits to the base station by using the last $J_2$-$K_2$ subframes of the $J_2$ HS-DPCCH subframes, where in this embodiment, $X_6$, $Y_6$, $Z_6$, and $L_2$ are all natural numbers;

the eighth indicator sending unit 1203 is configured to send a channel quality indicator that is represented by using R bits, a precoding indicator that is represented by using S bits, and a category indicator to the base station by using an HS-DPCCH subframe, where a value of the category indicator is used to indicate whether the channel quality indicator that is represented by using the R bits and/or the precoding indicator that is represented by using the S bits is the first channel quality indicator $CQI_1$, the third channel quality indicator $CQI_3$, and the precoding indicator PCI, or is the second channel quality indicator $CQI_2$, or is the first channel quality indicator $CQI_1$, the second channel quality indicator $CQI_2$, and the third channel quality indicator $CQI_3$, or is the second channel quality indicator $CQI_2$ and the precoding indicator PCI, or is the first channel quality indicator $CQI_1$, the second channel quality indicator $CQI_2$, the third channel quality indicator $CQI_3$, and the precoding indicator PCI, and in this embodiment, R and S are both natural numbers;

the ninth indicator sending unit 1204 is configured to, when the demodulation pilot is not detected, send the first channel quality indicator $CQI_1$ and the third channel quality indicator $CQI_3$ to the base station by using an HS-DPCCH subframe; and after the demodulation pilot is detected, according to an agreement with the base station, in a period of time from time $T_4$ to time $T_4'$ during sending an indicator, send the second channel quality indicator $CQI_2$, or send the first channel quality indicator $CQI_1$, the second channel quality indicator $CQI_2$, and the third channel quality indicator $CQI_3$, or send the second channel quality indicator $CQI_2$ and the precoding indicator PCI, or send the first channel quality indicator $CQI_1$, the second channel quality indicator $CQI_2$, the third channel quality indicator $CQI_3$, and the precoding indicator PCI, and in a period of time except from time $T_4$ to time $T_4'$ during sending an indicator, send the first channel quality indicator $CQI_1$, the third channel quality indicator $CQI_3$, and the precoding indicator PCI; and the tenth indicator sending unit 1205 is configured to spread the first channel quality indicator $CQI_1$, the third channel quality indicator $CQI_3$, and the precoding indicator PCI to a first orthogonal variable spreading factor code, spread the second channel quality indicator $CQI_2$ to a second orthogonal variable spreading factor code, and send the first channel quality indicator $CQI_1$, the second channel quality indicator $CQI_2$, the third channel quality indicator $CQI_3$, and the precoding indicator PCI to the base station by using an HS-DPCCH subframe after being spreaded.

In the channel quality indicator feedback apparatus shown in FIG. 12, when the result of the detection of the demodulation pilot is that the demodulation pilot is not detected, the information of the $Y_6$ bits that is used to represent the second channel quality indicator $CQI_2$, or information of the $Y_5$ bits that is in the information of the $V_2$ bits and is used to represent the second channel quality indicator $CQI_2$ is a special value agreed on with the base station.

An embodiment of the present invention further provides a computer storage medium, where a program may be stored in the computer storage medium, and the steps shown in FIG. 1 or FIG. 2 are included when the program is executed.

An embodiment of the present invention further provides a user equipment, including: an input apparatus, an output apparatus, a memory, and a processor. The processor executes the following steps: acquiring a first channel quality indicator $CQI_1$ based on detection of a pilot that is sent by a base station; acquiring a second channel quality indicator $CQI_2$ based on a result of detection of a demodulation pilot, where the result of the detection of the demodulation pilot includes that the demodulation pilot is not detected, and the demodulation pilot is used to demodulate a data channel during estimating a channel; and sending the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$.

An embodiment of the present invention further provides a user equipment, including: a receiver, a transmitter, and a processor. The receiver and the transmitter are separately connected to the processor. The receiver receives a pilot sent by a base station. The processor acquires a first channel quality indicator $CQI_1$ based on detection of the pilot that is sent by the base station, and acquires a second channel quality indicator $CQI_2$ based on a result of detection of a demodulation pilot, where the result of the detection of the demodulation pilot includes that the demodulation pilot is not detected, and the demodulation pilot is used to demodulate a data channel during estimating a channel. The transmitter sends the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$. Further, the user equipment may further include a memory that is connected to the processor, where the memory stores a program and/or an instruction that is executed by the processor.

In an embodiment of the foregoing user equipment, the transmitter is configured to set, in information of $W_1$ bits, the first channel quality indicator $CQI_1$ that is represented by using $N_1$ bits and the second channel quality indicator $CQI_2$ that is represented by using $M_1$ bits, and send the information of the $W_1$ bits to the base station by using a high speed dedicated physical control channel HS-DPCCH subframe; or, the transmitter is configured to, after the first channel quality indicator $CQI_1$ is represented by using $N_2$ bits, and the second channel quality indicator $CQI_2$ is represented by using $M_2$ bits, send information of the $N_2$ bits to the base station by using the first $Q_1$ subframes of $P_1$ HS-DPCCH subframes, and send information of the $M_2$ bits to the base station by using the last $P_1$-$Q_1$ subframes of the $P_1$ HS-DPCCH subframes; or, the transmitter is configured to send a channel quality indicator that is represented by using L bits and a category indicator to the base station by using an HS-DPCCH subframe, where a value of the category indicator is used to indicate whether the channel quality indicator that is represented by using the L bits is the first channel quality indicator $CQI_1$ or the second channel quality indicator $CQI_2$, or a value of the category indicator is used to indicate whether the channel quality indicator that is represented by using the M bits is the first channel quality indicator $CQI_1$, or the first channel quality indicator $CQI_1$ and the second channel quality indicator $CQI_2$; or, the transmitter is configured to, when the result of the detection of the demodulation pilot is that the demodulation pilot is not detected, send the first channel quality indicator $CQI_1$ to the base station by using an HS-DPCCH subframe, and after the demodulation pilot is detected, according to an agreement with the base station, in a period of time from time $T_1$ to time $T_1'$ during sending a channel quality indicator, send the second channel quality indicator $CQI_2$, or send the first channel quality indicator $CQI_1$ and the second channel quality indicator $CQI_2$, and in a period of time except from time $T_1$ to time $T_1'$ during sending a channel quality indicator, send the first channel quality indicator $CQI_1$; or, the transmitter is configured to spread the first channel quality indicator $CQI_1$ to a first orthogonal variable spreading factor code, spread the second channel quality indicator $CQI_2$ to a second orthogonal variable spreading factor code, and send the first channel quality indicator $CQI_1$ and the second channel quality indicator $CQI_2$ to the base station by using an HS-DPCCH subframe after being spreaded.

In another embodiment of the foregoing user equipment, the transmitter is configured to set, in information of $W_2$ bits, the first channel quality indicator $CQI_1$ that is represented by using $X_1$ bits, the second channel quality indicator $CQI_2$ that is represented by using $Y_1$ bits, and the third channel quality indicator $CQI_3$ that is represented by using $Z_1$ bits, and send the information of the $W_2$ bits to the base station by using one HS-DPCCH subframe or two successive HS-DPCCH subframes; or, the transmitter is configured to, after the first channel quality indicator $CQI_1$ is represented by using $X_2$ bits, the second channel quality indicator $CQI_2$ is represented by using $Y_2$ bits, and the third channel quality indicator $CQI_3$ is represented by using $Z_2$ bits, send information of the $X_2$ bits and information of the $Z_2$ bits to the base station by using the first $Q_2$ subframes of $P_2$ HS-DPCCH subframes, and send the information of the $X_2$ bits, information of the $Y_2$ bits, and the information of the $Z_2$ bits to the base station by using the last $P_2$-$Q_2$ subframes of the $P_2$ HS-DPCCH subframes; or, the transmitter is configured to send a channel quality indicator that is represented by using X bits and a category indicator to the base station by using an HS-DPCCH subframe, where a value of the category indicator is used to indicate whether the channel quality indicator that is represented by using the X bits is the first channel quality indicator $CQI_1$ and the third channel quality indicator $CQI_3$, or is the second channel quality indicator $CQI_2$, or is the first channel quality indicator $CQI_1$, the second channel quality indicator $CQI_2$, and the third channel quality indicator $CQI_3$; or, the transmitter is configured to, when the demodulation pilot is not detected, send the first channel quality indicator $CQI_1$ and the second channel quality indicator $CQI_2$ to the base station by using an HS-DPCCH subframe, and after the demodulation pilot is detected, according to an agreement with the base station, in a period of time from time $T_2$ to time $T_2'$ during sending a channel quality indicator, send the second channel quality indicator $CQI_2$, or send the first channel quality indicator $CQI_1$, the second channel quality indicator $CQI_2$, and the third channel quality indicator $CQI_3$, and in a period of time except from time $T_2$ to time $T_2'$ during sending a channel quality indicator, send the first channel quality indicator $CQI_1$ and the third channel quality indicator $CQI_3$; or, the transmitter is configured to spread the first channel quality indicator $CQI_1$ and the third channel quality indicator $CQI_3$ to a first orthogonal variable spreading factor code, spread the second channel quality indicator $CQI_2$ to a second orthogonal variable spreading factor code, and send the first channel quality indicator $CQI_1$, the second channel quality indicator $CQI_2$, and the third channel quality indicator $CQI_3$ to the base station by using an HS-DPCCH subframe after being spreaded.

An embodiment of the present invention further provides a user equipment, including: an input apparatus, an output apparatus, a memory, and a processor. The processor executes the following steps: acquiring a precoding indicator PCI and a first channel quality indicator $CQI_1$ based on detection of a pilot that is sent by a base station; acquiring a second channel quality indicator $CQI_2$ based on a result of detection of a demodulation pilot, where the result of the detection of the demodulation pilot includes that the demodulation pilot is not detected, and the demodulation pilot is used to demodulate a data channel during estimating a channel; and sending the precoding indicator PCI, the first channel quality indicator $CQI_1$, and/or the second channel quality indicator $CQI_2$ to the base station in a manner in which the base station can distinguish the precoding indicator PCI, the first channel quality indicator $CQI_1$, and/or the second channel quality indicator $CQI_2$.

An embodiment of the present invention further provides a user equipment, including: a receiver, a transmitter, and a processor. The receiver and the transmitter are separately connected to the processor. The receiver receives a pilot sent by a base station. The processor acquires a precoding indicator PCI and a first channel quality indicator $CQI_1$ based on detection of the pilot that is sent by the base station, and acquires a second channel quality indicator $CQI_2$ based on a result of detection of a demodulation pilot. The transmitter sends the precoding indicator PCI, the first channel quality indicator $CQI_1$, and/or the second channel quality indicator $CQI_2$ to the base station in a manner in which the base station can distinguish the precoding indicator PCI, the first channel quality indicator $CQI_1$, and/or the second channel quality indicator $CQI_2$. Further, the user equipment may further include a memory that is connected to the processor, where the memory stores a program and/or an instruction that is executed by the processor.

In an embodiment of the foregoing user equipment, the transmitter is configured to set, in information of $V_1$ bits, the first channel quality indicator $CQI_1$ that is represented by using $X_3$ bits, the second channel quality indicator $CQI_2$ that is represented by using $Y_3$ bits, and the precoding indicator PCI that is represented by using $Z_3$ bits, and send the information of the $V_1$ bits to the base station by using a high speed dedicated physical control channel HS-DPCCH subframe; or, the transmitter is configured to, after the first channel quality indicator $CQI_1$ is represented by using $X_4$ bits, the second channel quality indicator $CQI_2$ is represented by using $Y_4$ bits, and the precoding indicator PCI is represented by using $Z_4$ bits, send information of the $X_4$ bits and information of the $Z_4$ bits to the base station by using the first $K_1$ subframes of $J_1$ HS-DPCCH subframes, and send the information of the $X_4$ bits, information of the $Y_4$ bits, and the information of the $Z_4$ bits to the base station by using the last $J_1-K_1$ subframes of the $J_1$ HS-DPCCH subframes, or send the information of the $X_4$ bits and the information of the $Y_4$ bits to the base station by using the last $J_1-K_1$ subframes of the $J_1$ HS-DPCCH subframes; or, the transmitter is configured to send a channel quality indicator that is represented by using M bits, a precoding indicator that is represented by using N bits, and a category indicator to the base station by using an HS-DPCCH subframe, where a value of the category indicator is used to indicate whether the channel quality indicator that is represented by using the M bits is the first channel quality indicator $CQI_1$ or the second channel quality indicator $CQI_2$, or is the first channel quality indicator $CQI_1$, or the first channel quality indicator $CQI_1$ and the second channel quality indicator $CQI_2$; or, the transmitter is configured to, when the result of the detection of the demodulation pilot is that the demodulation pilot is not detected, send the first channel quality indicator $CQI_1$ to the base station by using an HS-DPCCH subframe, and after the demodulation pilot is detected, according to an agreement with the base station, in a period of time from time $T_3$ to time $T_3'$ during sending an indicator, send the second channel quality indicator $CQI_2$, or send the second channel quality indicator $CQI_2$ and the precoding indicator PCI, or send the first channel quality indicator $CQI_1$, the second channel quality indicator $CQI_2$, and the precoding indicator PCI, and in a period of time except from time $T_3$ to time $T_3'$ during sending an indicator, send the first channel quality indicator $CQI_1$ and the precoding indicator PCI; or, the transmitter is configured to spread the first channel quality indicator $CQI_1$ and the precoding indicator PCI to a first orthogonal variable spreading factor code, spread the second channel quality indicator $CQI_2$ to a second orthogonal variable spreading factor code, and send the first channel quality indicator $CQI_1$, the second channel quality indicator $CQI_2$, and the precoding indicator PCI to the base station by using an HS-DPCCH subframe after being spreaded.

In another embodiment of the foregoing user equipment, the transmitter sets, in information of $V_2$ bits, the first channel quality indicator $CQI_1$ that is represented by using $X_5$ bits, the second channel quality indicator $CQI_2$ that is represented by using $Y_5$ bits, the third channel quality indicator $CQI_3$ that is represented by using $Z_5$ bits, and the precoding indicator PCI that is represented by using $L_1$ bits, and sends the information of the $V_2$ bits to the base station by using one HS-DPCCH subframe; or the transmitter is configured to, after the first channel quality indicator $CQI_1$ is represented by using $X_6$ bits, the second channel quality indicator $CQI_2$ is represented by using $Y_6$ bits, the third channel quality indicator $CQI_3$ is represented by using $Z_6$ bits, and the precoding indicator PCI is represented by using $L_2$ bits, send information of the $X_6$ bits, information of the $Z_6$ bits, and information of the $L_2$ bits to the base station by using the first $K_2$ subframes of $J_2$ HS-DPCCH subframes, and send the information of the $X_6$ bits, information of the $Y_6$ bits, and the information of the $Z_6$ bits, or, send the information of the $X_6$ bits, information of the $Y_6$ bits, the information of the $Z_6$ bits, and the information of the $L_2$ bits to the base station by using the last $J_2-K_2$ subframes of the $J_2$ HS-DPCCH subframes; or, the transmitter is configured to send a channel quality indicator that is represented by using R bits, a precoding indicator that is represented by using S bits, and a category indicator to the base station by using an HS-DPCCH subframe, where a value of the category indicator is used to indicate whether the channel quality indicator that is represented by using the R bits and/or the precoding indicator that is represented by using the S bits is the first channel quality indicator $CQI_1$, the third channel quality indicator $CQI_3$, and the precoding indicator PCI, or is the second channel quality indicator $CQI_2$, or is the first channel quality indicator $CQI_1$, the second channel quality indicator $CQI_2$, and the third channel quality indicator $CQI_3$, or is the second channel quality indicator $CQI_2$ and the precoding indicator PCI, or is the first channel quality indicator $CQI_1$, the second channel quality indicator $CQI_2$, the third channel quality indicator $CQI_3$, and the precoding indicator PCI; or, the transmitter is configured to, when the result of the detection of the demodulation pilot is that the demodulation pilot is not detected, send the first channel quality indicator $CQI_1$ and the third channel quality indicator $CQI_3$ to the base station by using an HS-DPCCH subframe, and after the demodulation pilot is detected, according to an agreement with the base station, in a period of time from time $T_4$ to time $T_4'$ during sending an indicator, send the second channel quality indicator $CQI_2$, or send the first channel quality indicator $CQI_1$, the second channel quality indicator $CQI_2$, and the third channel quality indicator $CQI_3$, or send the second channel quality indicator $CQI_2$ and the precoding indicator PCI, or send the first channel quality indicator $CQI_1$, the second channel quality indicator $CQI_2$, the third channel quality indicator $CQI_3$, and the precoding indicator PCI, and in a period of time except from time $T_4$ to time $T_4'$ during sending an indicator, send the first channel quality indicator $CQI_1$, the third channel quality indicator $CQI_3$, and the precoding indicator PCI; or, the transmitter is configured to spread the first channel quality indicator $CQI_1$, the third channel quality indicator $CQI_3$, and the precoding indicator PCI to a first orthogonal variable spreading factor code, spread the second channel quality indicator $CQI_2$ to a second orthogonal variable spreading factor code, and send the first channel quality indicator $CQI_1$, the second channel quality indicator $CQI_2$, the third channel quality indicator $CQI_3$, and the precoding indicator PCI to the base station by using an HS-DPCCH subframe after being spreaded.

Figure 13:
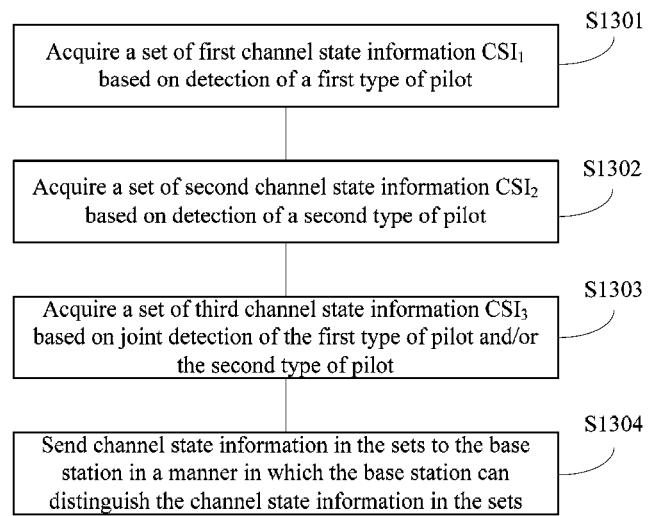
FIG. 13 is a schematic flowchart of a channel quality indicator feedback method according to another embodiment of the present invention.

For an actual communications network, there are generally two networking manners, which are macro-micro cell networking and macro-micro multi-sector networking. When a networking manner is the macro-micro cell networking, there is at least one micro-cell network in coverage of a macro cell, and positions of transmitting points of the macro cell and a micro cell may be different. When the networking manner is the macro-micro multi-sector networking, there are multiple sub-sectors in a macro sector, and transmission points of the macro sector and a micro sector are at a same position, but have different transmission directions. Regardless of whether the networking manner is the macro-micro cell networking or the macro-micro multi-sector networking, two types of pilots may be configured for a network, where a first type of pilot includes a primary pilot sent on a primary common pilot channel, and a second type of pilot includes a secondary pilot sent on a secondary pilot channel. The first type of pilot in the network has to be transmitted all the time, which may be one or more pilots, and may be transmitted by a transmission point of the macro cell (for example, a macro base station) independently, or may be transmitted by multiple transmission points such as transmission points of the macro cell and the micro cell; the first type of pilot has relatively wide coverage, and therefore, the pilot can be received by all UEs in coverage of the macro cell. The second type of pilot in the network may also be one or more pilots; different from the first type of pilot, the second type of pilot can only be transmitted by transmission points of one or more micro cells (for example, a micro base station), the second type of pilot can only cover one or more micro cells, and therefore, coverage is relatively small. In an embodiment of the present invention, a user equipment of the macro-micro cell networking or macro-micro multi-sector networking may acquire a set of channel state information by jointly detecting the first type of pilot and/or the second type of pilot. Referring to FIG. 13, FIG. 13 is a schematic flowchart of a channel quality indicator feedback method according to another embodiment of the present invention, and the method may be executed by a user equipment (UE). The method shown in FIG. 13 mainly includes step S1301, step S1302, step S1303, and step S1304:

S1301: Acquire a set of first channel state information $CSI_1$ based on detection of a first type of pilot.

When a base station has no data to send to a UE, the base station sends the first type of pilot, for example, a primary pilot, to the UE by using a P-CPICH. As mentioned above, because the first type of pilot may be one or more pilots, the first channel state information $CSI_1$ that is acquired by the UE by detecting the first type of pilot is a set, which means including one or more pieces of the first channel state information $CSI_1$. Specifically, the acquiring a set of first channel state information $CSI_1$ based on detection of a first type of pilot may be acquiring a type-1 channel quality indicator $CQI_1$ and/or a type-1 precoding indicator $PCI_1$ based on detection of the primary pilot, which means that the set of the first channel state information $CSI_1$ may include one or more type-1 channel quality indicators $CQI_1$s, one or more type-1 precoding indicators $PCI_1$ s, or at least one type-1 channel quality indicator $CQI_1$ and at least one type-1 precoding indicator $PCI_1$. The channel quality indicator (CQI) is a numeric value; when the CQI is represented by using N bits, a value range is any numeric value between 0 and $2^N-1$. The CQI has a mapping relationship with a data-block block length; that is, a value mapped by each CQI represents a largest data-block block length that the base station can allocate to a UE reporting the CQI. For example, if CQI=1, according to the mapping relationship, the largest data-block block length that the base station allocates to the UE reporting the CQI is 100 KB; if CQI=2, according to the mapping relationship, the largest data-block block length that the base station allocates to the UE reporting the CQI is 135 KB; and so on. When the precoding indicator (PCI) is represented by using L bits, a value range of the PCI is 0 to $2^L-1$, and a value of each PCI represents a combination of precoding weighted values, for example, specific numeric numbers of a precoding weighted value w1 and a precoding weighted value w2. The base station uses the PCI to determine precoding of data that is to be sent to the UE, so that transmitted data has relatively good quality of reception at the UE, and uses the PCI to determine a size of a data packet that is to be sent to the UE.

S1302: Acquire a set of second channel state information $CSI_2$ based on detection of a second type of pilot.

Specifically, the acquiring a set of second channel state information $CSI_2$ based on detection of a second type of pilot may be acquiring a type-2 channel quality indicator $CQI_2$ and/or a type-2 precoding indicator $PCI_2$ based on detection of the secondary pilot, which means that the set of the second channel state information $CSI_2$ may include one or more type-2 channel quality indicators $CQI_2$ s, one or more type-2 precoding indicators $PCI_2$ s, or at least one type-2 channel quality indicator $CQI_2$ and at least one type-2 precoding indicator $PCI_2$.

S1303: Acquire a set of third channel state information $CSI_3$ based on joint detection of the first type of pilot and/or the second type of pilot.

In this embodiment of the present invention, the joint detection of the first type of pilot and/or the second type of pilot may be jointly detecting multiple pilots in the first type of pilot, jointly detecting multiple pilots in the second type of pilot, or jointly detecting multiple pilots in the first type of pilot and in the second type of pilot, where the jointly detecting multiple pilots in the first type of pilot and in the second type of pilot may be, for example, jointly detecting one pilot in the first type of pilot and one pilot in the second type of pilot. Specifically, the acquiring a set of third channel state information $CSI_3$ based on joint detection of the first type of pilot and/or the second type of pilot may be acquiring a type-3 channel quality indicator $CQI_3$ and/or a type-3 precoding indicator $PCI_3$ based on joint detection of the primary pilot and/or the secondary pilot, which means that the set of third channel state information $CSI_3$ may include one or more type-3 channel quality indicators $CQI_3$ s, one or more type-3 precoding indicators $PCI_3$ s, or at least one type-3 channel quality indicator $CQI_3$ and at least one type-3 precoding indicator $PCI_3$.

S1304: Send channel state information in the sets to a base station in a manner in which the base station can distinguish the channel state information in the sets.

Specifically, the sending channel state information in the sets to the base station in a manner in which the base station can distinguish the channel state information in the sets may be sending the channel state information in the sets to the base station by using an HS-DPCCH.

As an embodiment of the sending the channel state information in the sets to the base station by using an HS-DPCCH, after the channel state information in the sets is represented by using different bits, when being sent to the base station, the channel state information in the sets is carried in corresponding bit positions of different HS-DPCCHs or in one or more subframes of a same HS-DPCCH. In an example in which the channel state information in the sets is carried in corresponding bit positions of different HS-DPCCHs when the channel state information in the sets is sent to the base station, assuming that a piece of channel state information $CSI_1$ is selected from the set of first channel state information $CSI_1$, a piece of channel state information $CSI_2$ is selected from the set of second channel state information $CSI_2$, and a piece of channel state information $CSI_3$ is selected from the set of third channel state information $CSI_3$, and in this case, the three pieces of channel state information may be carried in corresponding bit positions of three different HS-DPCCHs, and the three HS-DPCCHs are distinguished by orthogonal codes. Alternatively, corresponding bits of the foregoing three pieces of channel state information $CSI_1$, $CSI_2$, and $CSI_3$ may be encoded to obtain encoded information, and the encoded information is carried in a same HS-DPCCH subframe of a same HS-DPCCH channel; after receiving the encoded information, the base station can distinguish the three pieces of channel state information $CSI_1$, $CSI_2$, and $CSI_3$ by decoding. Another embodiment is that corresponding bits of the three pieces of channel state information $CSI_1$, $CSI_2$, and $CSI_3$ are encoded to obtain encoded information, and the encoded information is carried in different HS-DPCCH subframes of a same HS-DPCCH channel, which means that each subframe carries a part of the encoded information; after receiving all the encoded information, the base station can distinguish the foregoing three pieces of channel state information $CSI_1$, $CSI_2$, and $CSI_3$ by decoding.

As another embodiment of the sending the channel state information in the sets to the base station by using an HS-DPCCH subframe, a number may be used to perform category indication on the channel state information in the sets, and the channel state information in the sets and a corresponding number are sent to the base station. For example, all channel state information in the set of first channel state information $CSI_1$, in the set of second channel state information $CSI_2$, and in the set of third channel state information $CSI_3$ is numbered by using M bits; and then when the channel state information is sent, the channel state information and a corresponding number may be sent to the base station together.

In the foregoing embodiment, after acquiring the set of first channel state information $CSI_1$, the set of second channel state information $CSI_2$, and the set of third channel state information $CSI_3$ by detecting, the channel state information in the sets is sent to the base station. Actually, the base station may not require all the channel state information in the sets, or it may also meet a requirement of the base station of understanding a current channel state when only a part of the channel state information is sent to the base station, and in this way, resources may further be saved. Therefore, in this embodiment of the present invention, according to a specific case, the channel state information in the sets may be filtered, and filtered channel state information is sent to the base station.

After the set of first channel state information $CSI_1$, the set of second channel state information $CSI_2$, and the set of third channel state information $CSI_3$ are acquired by detecting, as an embodiment of the present invention of filtering the channel state information in the sets, according to a specific requirement, one or more pieces of channel state information may be selected from the set of first channel state information $CSI_1$ and/or the set of second channel state information $CSI_2$ and/or the set of third channel state information $CSI_3$ to form a set of fourth channel state information $CSI_4$. As another embodiment of the present invention of filtering the channel state information in the sets, channel state information reflecting a channel state that is best, relatively good, or better than a specific channel state may be selected from the set of first channel state information $CSI_1$ and/or the set of second channel state information $CSI_2$ and/or the set of third channel state information $CSI_3$ to form a set of fourth channel state information $CSI_4$. In this case, the sending channel state information in the sets to the base station in a manner in which the base station can distinguish the channel state information in the sets shown in FIG. 13 may be sending channel state information in the set of fourth channel state information $CSI_4$ to the base station by using an HS-DPCCH. Specifically, after the channel state information in the set of fourth channel state information $CSI_4$ is represented by using different bits, when sent to the base station, the channel state information in the set of fourth channel state information $CSI_4$ may be carried in corresponding bit positions of different HS-DPCCHs or in one or more subframes of a same HS-DPCCH; or, a number may be used to perform category indication on the channel state information in the set of fourth channel state information $CSI_4$, and the channel state information in the set of fourth channel state information $CSI_4$ and a corresponding number are sent to the base station.

Figure 14:
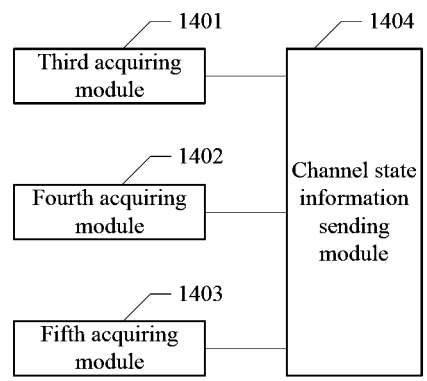
FIG. 14 is a schematic structural diagram of a channel quality indicator feedback apparatus according to another embodiment of the present invention.

Referring to FIG. 14, FIG. 14 is a schematic structural diagram of a channel quality indicator feedback apparatus according to another embodiment of the present invention. For ease of description, only parts related to this embodiment of the present invention are shown. The channel quality indicator feedback apparatus shown in FIG. 14 may be a user equipment in a WCDMA system or a function unit/module in the user equipment, and includes a third acquiring module 1401, a fourth acquiring module 1402, a fifth acquiring module 1403, and a channel state information sending module 1404, where:

the third acquiring module 1401 is configured to acquire a set of first channel state information $CSI_1$ based on detection of a first type of pilot;

the fourth acquiring module 1402 is configured to acquire a set of second channel state information $CSI_2$ based on detection of a second type of pilot;

the fifth acquiring module 1403 is configured to acquire a set of third channel state information $CSI_3$ based on joint detection of the first type of pilot and/or the second type of pilot; and the channel state information sending module 1404 is configured to send channel state information in the sets to a base station in a manner in which the base station can distinguish the channel state information in the sets.

Figure 15:
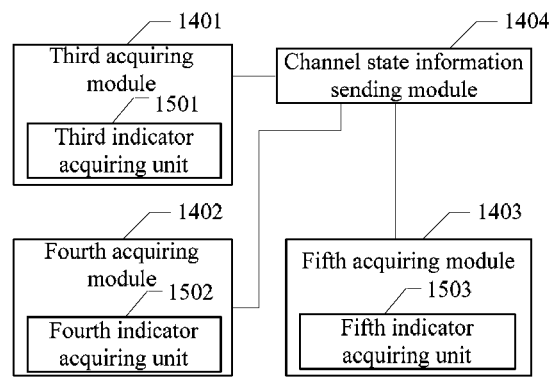
FIG. 15 is a schematic structural diagram of a channel quality indicator feedback apparatus according to another embodiment of the present invention.

In the channel quality indicator feedback apparatus shown in FIG. 14, the first type of pilot includes a primary pilot that is sent on a primary common pilot channel, and the second type of pilot includes a secondary pilot that is sent on a secondary pilot channel. The third acquiring module 1401 includes a third indicator acquiring unit 1501, the fourth acquiring module 1402 includes a fourth indicator acquiring unit 1502, and the fifth acquiring module 1403 includes a fifth indicator acquiring unit 1503. As shown in FIG. 15, FIG. 15 shows a channel quality indicator feedback apparatus according to another embodiment of the present invention, where:

the third indicator acquiring unit 1501 is configured to acquire a type-1 channel quality indicator $CQI_1$ and/or a type-1 precoding indicator $PCI_1$ based on detection of the primary pilot;

the fourth indicator acquiring unit 1502 is configured to acquire a type-2 channel quality indicator $CQI_2$ and/or a type-2 precoding indicator $PCI_2$ based on detection of the secondary pilot; and the fifth indicator acquiring unit 1503 is configured to acquire a type-3 channel quality indicator $CQI_3$ and/or a type-3 precoding indicator $PCI_3$ based on joint detection of the primary pilot and/or the secondary pilot.

Figure 16:
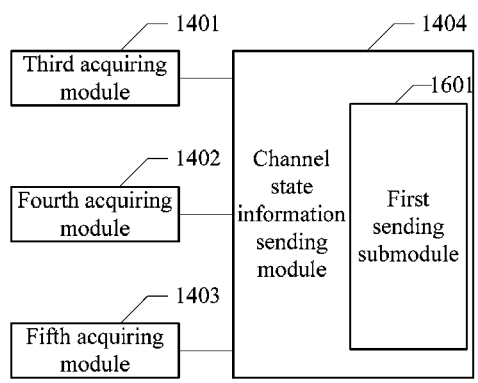
FIG. 16 is a schematic structural diagram of a channel quality indicator feedback apparatus according to another embodiment of the present invention.

The channel state information sending module 1404 shown in FIG. 14 includes a first sending submodule 1601. As shown in FIG. 16, FIG. 16 shows a channel quality indicator feedback apparatus according to another embodiment of the present invention. The first sending submodule 1601 is configured to send the channel state information in the sets to the base station by using an HS-DPCCH subframe.

Figure 17:
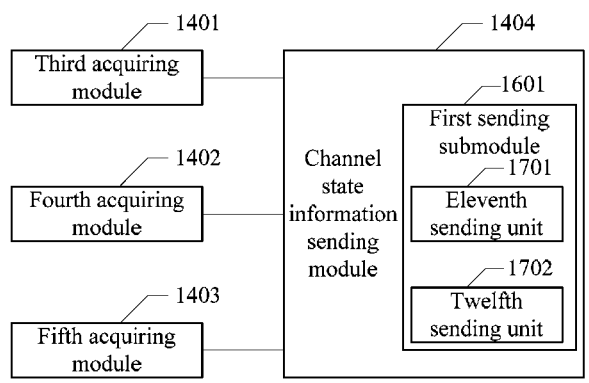
FIG. 17 is a schematic structural diagram of a channel quality indicator feedback apparatus according to another embodiment of the present invention.

The first sending submodule 1601 shown in FIG. 14 includes an eleventh sending unit 1701 or a twelfth sending unit 1702. As shown in FIG. 17, FIG. 17 shows a channel quality indicator feedback apparatus according to another embodiment of the present invention, where:

the eleventh sending unit 1701 is configured to, after the channel state information in the sets is represented by using different bits, when sending the channel state information to the base station, carry the channel state information in the sets in corresponding bit positions of different HS-DPCCHs or in one or more subframes of a same HS-DPCCH; and the twelfth sending unit 1702 is configured to use a number to perform category indication on the channel state information in the sets, and send the channel state information in the sets and a corresponding number to the base station.

Figure 18:
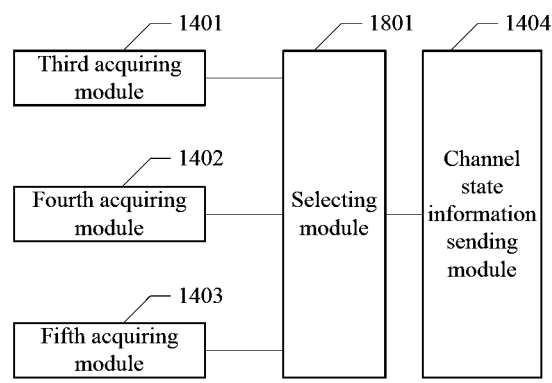
FIG. 18 is a schematic structural diagram of a channel quality indicator feedback apparatus according to another embodiment of the present invention.

The channel quality indicator feedback apparatus shown in FIG. 14 further includes a selecting module 1801. As shown in FIG. 18, FIG. 18 shows a channel quality indicator feedback apparatus according to another embodiment of the present invention. The selecting module 1801 is configured to, according to a specific requirement, select one or more pieces of channel state information from the set of first channel state information $CSI_1$ and/or the set of second channel state information $CSI_2$ and/or the set of third channel state information $CSI_3$, to form a set of fourth channel state information $CSI_4$; or, select, from the set of first channel state information $CSI_1$ and/or the set of second channel state information $CSI_2$ and/or the set of third channel state information $CSI_3$, channel state information reflecting a channel state that is best, relatively good, or better than a specific channel state, to form a set of fourth channel state information $CSI_4$.

Figure 19:
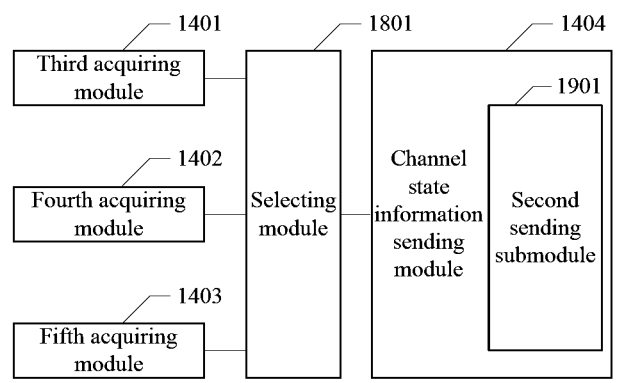
FIG. 19 is a schematic structural diagram of a channel quality indicator feedback apparatus according to another embodiment of the present invention.

The channel state information sending module 1404 shown in FIG. 18 includes a second sending submodule 1901. As shown in FIG. 19, FIG. 19 shows a channel quality indicator feedback apparatus according to another embodiment of the present invention. The second sending submodule 1901 is configured to send channel state information in the set of fourth channel state information $CSI_4$ to the base station by using an HS-DPCCH subframe.

Figure 20:
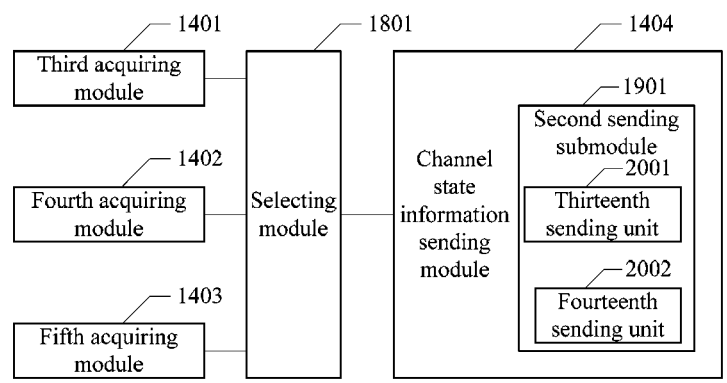
FIG. 20 is a schematic structural diagram of a channel quality indicator feedback apparatus according to another embodiment of the present invention.

The second sending submodule 1901 shown in FIG. 19 includes a thirteenth sending unit 2001 or a fourteenth sending unit 2002. As shown in FIG. 20, FIG. 20 shows a channel quality indicator feedback apparatus according to another embodiment of the present invention, where:

the thirteenth sending unit 2001 is configured to, after the channel state information in the set of fourth channel state information $CSI_4$ is represented by using different bits, when sending the channel state information to the base station, carry the channel state information in the set of fourth channel state information $CSI_4$ in corresponding bit positions of different HS-DPCCHs or in one or more subframes of a same HS-DPCCH; and the fourteenth sending unit 2002 is configured to use a number to perform category indication on the channel state information in the set of fourth channel state information $CSI_4$, and send the channel state information in the set of fourth channel state information $CSI_4$ and a corresponding number to the base station.

Another embodiment of the present invention further provides a computer storage medium, where a program may be stored in the computer storage medium, and when the program is executed, the following steps are included: acquiring a set of first channel state information $CSI_1$ based on detection of a first type of pilot; acquiring a set of second channel state information $CSI_2$ based on detection of a second type of pilot; acquiring a set of third channel state information $CSI_3$ based on joint detection of the first type of pilot and/or the second type of pilot; and sending channel state information in the sets to a base station in a manner in which the base station can distinguish the channel state information in the sets.

Another embodiment of the present invention further provides a user equipment, including: a receiver, a transmitter, and a processor, where the receiver and the transmitter are separately connected to the processor. The receiver receives a first type of pilot, a second type of pilot, and a third type of pilot. The processor acquires a set of first channel state information $CSI_1$ based on detection of the first type of pilot that is received by the receiver; acquires a set of second channel state information $CSI_2$ based on detection of the second type of pilot that is received by the receiver; and acquires a set of third channel state information $CSI_3$ based on joint detection of the first type of pilot and/or the second type of pilot that is received by the receiver. The transmitter sends channel state information in the sets to a base station in a manner in which the base station can distinguish the channel state information in the sets. Further, the user equipment may further include a memory that is connected to the processor, where the memory stores a program and/or an instruction that is executed by the processor.

As an embodiment of the present invention, the first type of pilot includes a primary pilot sent on a primary common pilot channel, and the second type of pilot includes a secondary pilot sent on a secondary pilot channel. The processor is specifically configured to acquire a type-1 channel quality indicator $CQI_1$ and/or a type-1 precoding indicator $PCI_1$ based on detection of the primary pilot; acquire a type-2 channel quality indicator $CQI_2$ and/or a type-2 precoding indicator $PCI_2$ based on detection of the secondary pilot; and acquire a type-3 channel quality indicator $CQI_3$ and/or a type-3 precoding indicator $PCI_3$ based on joint detection of the primary pilot and/or the secondary pilot. In this embodiment, the transmitter sends the channel state information in the sets to the base station by using a high speed dedicated physical control channel HS-DPCCH. Specifically, after the channel state information in the sets is represented by using different bits, the transmitter carries the channel state information in the sets in corresponding bit positions of different HS-DPCCHs or in one or more subframes of a same HS-DPCCH when sending the channel state information to the base station; or, the transmitter uses a number to perform category indication on the channel state information in the sets, and sends the channel state information in the sets and a corresponding number to the base station.

In another embodiment of the present invention, the user equipment further includes a selector, where the selector is connected to the processor, and is configured to, according to a specific requirement, select one or more pieces of channel state information from the set of first channel state information $CSI_1$ and/or the set of second channel state information $CSI_2$ and/or the set of third channel state information $CSI_3$, to form a set of fourth channel state information $CSI_4$; or, select, from the set of first channel state information $CSI_1$ and/or the set of second channel state information $CSI_2$ and/or the set of third channel state information $CSI_3$, channel state information reflecting a channel state that is best, relatively good, or better than a specific channel state, to form a set of fourth channel state information $CSI_4$. In this embodiment, the transmitter sends channel state information in the set of fourth channel state information $CSI_4$ to the base station by using a high speed dedicated physical control channel HS-DPCCH. Specifically, after the channel state information in the set of fourth channel state information $CSI_4$ is represented by using different bits, the transmitter carries the channel state information in the set of fourth channel state information $CSI_4$ in corresponding bit positions of different high speed dedicated physical control channels HS-DPCCHs or in one or more subframes of a same HS-DPCCH when sending the channel state information to the base station; or, the transmitter uses a number to perform category indication on the channel state information in the set of fourth channel state information $CSI_4$, and sends the channel state information in the set of fourth channel state information $CSI_4$ and a corresponding number to the base station.

It should be noted that, because content of information exchange and an execution process between all modules/units of the foregoing apparatus is based on a same conception as the method embodiments of the present invention, and a technical effect brought by the apparatus is the same as the method embodiments of the present invention; for detailed content, refer to descriptions of the method embodiments of the present invention, which is not further described herein.

A person skilled in the art may understand that all or some of the steps of the methods in the foregoing embodiments may be implemented by a computer program instructing relevant hardware, for example, one or more or all of the following methods:

Method 1: Acquire a first channel quality indicator $CQI_1$ based on detection of a pilot that is sent by a base station; acquire a second channel quality indicator $CQI_2$ based on a result of detection of a demodulation pilot; and send the first channel quality indicator $CQI_1$ and/or the second channel quality indicator $CQI_2$ to the base station in a manner in which the base station can distinguish the first channel quality indicator $CQI_1$ and/or the second channel quality indicator $CQI_2$.

Manner 2: Acquire a precoding indicator PCI and a first channel quality indicator $CQI_1$ based on detection of a pilot that is sent by a base station; acquire a second channel quality indicator $CQI_2$ based on a result of detection of a demodulation pilot; and send the precoding indicator PCI, the first channel quality indicator $CQI_1$, and/or the second channel quality indicator $CQI_2$ to the base station in a manner in which the base station can distinguish the precoding indicator PCI, the first channel quality indicator $CQI_1$, and/or the second channel quality indicator $CQI_2$.

Manner 3: Acquire a set of first channel state information $CSI_1$ based on detection of a first type of pilot; acquire a set of second channel state information $CSI_2$ based on detection of a second type of pilot; acquire a set of third channel state information $CSI_3$ based on joint detection of the first type of pilot and/or the second type of pilot; and send channel state information in the sets to the base station in a manner in which the base station can distinguish the channel state information in the sets.

A person of ordinary skill in the art may understand that all or a part of the steps of the methods in the embodiments may be implemented by a program instructing relevant hardware. The program may be stored in a computer readable storage medium. The storage medium may include: a read-only memory (Read-Only Memory, ROM), a random access memory (Random Access Memory, RAM), a magnetic disk, or an optical disc.

The channel quality indicator feedback method and apparatus, and user equipment provided by the embodiments of the present invention are described above in detail. Specific examples are used in this specification to describe the principle and implementation manners of the present invention. The descriptions of the foregoing embodiments are merely intended to help understand the method and core idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A channel quality indicator feedback method, wherein the method comprises:
    acquiring a first channel quality indicator ($CQI_1$) based on detecting a pilot sent by a base station;
    acquiring a second channel quality indicator ($CQI_2$) based on detecting a demodulation pilot, wherein the demodulation pilot is used to demodulate a data channel during estimating a channel; and
    sending the first channel quality indicator ($CQI_1$) or the second channel quality indicator ($CQI_2$) to the base station, depending on whether the demodulation pilot is detected, such that the base station distinguishes between the first channel quality indicator ($CQI_1$) and the second channel quality indicator ($CQI_2$).

2. The method according to claim 1, wherein the pilot comprises a primary pilot sent on a primary common pilot channel, and the acquiring of a first channel quality indicator ($CQI_1$) is based on detection of the primary pilot that is sent by the base station.

3. The method according to claim 1, wherein the sending of the first channel quality indicator ($CQI_1$) or the second channel quality indicator ($CQI_2$) to the base station comprises:
    setting, in information of $W_1$ bits, the first channel quality indicator ($CQI_1$) that is represented by using $N_1$ bits and the second channel quality indicator ($CQI_2$) that is represented by using $M_1$ bits, and sending the information of the $W_1$ bits to the base station by using a high speed dedicated physical control channel (HS-DPCCH) subframe; or
    representing the first channel quality indicator ($CQI_1$) by using $N_2$ bits, representing the second channel quality indicator ($CQI_2$) by using $M_2$ bits, sending information of the $N_2$ bits to the base station by using the first $Q_1$ subframes of $P_1$ HS-DPCCH subframes, and sending information of the $M_2$ bits to the base station by using the last $P_1$-$Q_1$ subframes of the $P_1$ HS-DPCCH subframes;
    sending a channel quality indicator that is represented by using L bits and a category indicator to the base station by using an HS-DPCCH subframe, wherein a value of the category indicator is used to indicate whether the channel quality indicator that is represented by using the L bits is the first channel quality indicator ($CQI_1$) or the second channel quality indicator ($CQI_2$), or a value of the category indicator is used to indicate whether the channel quality indicator that is represented by using the L bits is the first channel quality indicator ($CQI_1$), or the first channel quality indicator ($CQI_1$) and the second channel quality indicator ($CQI_2$);
    based on the detection of the demodulation pilot, sending the first channel quality indicator ($CQI_1$) to the base station by using an HS-DPCCH subframe, and after the demodulation pilot is detected, according to an agreement with the base station and in a period of time from time $T_1$ to time $T_1'$ during sending a channel quality indicator, sending the second channel quality indicator ($CQI_2$), or sending the first channel quality indicator ($CQI_1$) and the second channel quality indicator ($CQI_2$), and in a period of time except from time $T_1$ to time $T_1'$ during sending a channel quality indicator, sending the first channel quality indicator ($CQI_1$); or
    spreading the first channel quality indicator ($CQI_1$) to a first orthogonal variable spreading factor code, spreading the second channel quality indicator ($CQI_2$) to a second orthogonal variable spreading factor code, and sending the spreaded first channel quality indicator ($CQI_1$) and the spreaded second channel quality indicator ($CQI_2$) to the base station by using an HS-DPCCH subframe.

4. The method according to claim 1, wherein, based on the detection of the demodulation pilot, information of $M_2$ bits that is used to represent the second channel quality indicator ($CQI_2$), or information of $M_1$ bits that is in information of $W_1$ bits and is used to represent the second channel quality indicator ($CQI_2$) is a value agreed on with the base station.

5. The method according to claim 1, wherein the pilot comprises a beamforming pilot and a primary pilot that is sent on a primary common pilot channel; and
    the method further comprises: acquiring a third channel quality indicator ($CQI_3$) based on detection of the beamforming pilot; and sending the third channel quality indicator ($CQI_3$) to the base station in a manner such that the base station can distinguish the third channel quality indicator ($CQI_3$).

6. The method according to claim 5, wherein the sending of the first channel quality indicator ($CQI_1$), the second channel quality indicator ($CQI_2$), or the third channel quality indicator ($CQI_3$) to the base station such the base station can distinguish between the first channel quality indicator ($CQI_1$), the second channel quality indicator ($CQI_2$), and the third channel quality indicator ($CQI_3$) comprises:
    setting, in information of $W_2$ bits, the first channel quality indicator ($CQI_1$) that is represented by using $X_1$ bits, the second channel quality indicator ($CQI_2$) that is represented by using $Y_1$ bits, and the third channel quality indicator ($CQI_3$) that is represented by using $Z_1$ bits, and sending the information of the $W_2$ bits to the base station by using one HS-DPCCH subframe or two successive HS-DPCCH subframes;
    after the first channel quality indicator ($CQI_1$) is represented by using $X_2$ bits, the second channel quality indicator ($CQI_2$) is represented by using $Y_2$ bits, and the third channel quality indicator ($CQI_3$) is represented by using $Z_2$ bits, sending information of the $X_2$ bits and information of the $Z_2$ bits to the base station by using the first $Q_2$ subframes of $P_2$ HS-DPCCH subframes, and sending the information of the $X_2$ bits, information of the $Y_2$ bits, and the information of the $Z_2$ bits to the base station by using the last $P_2$-$Q_2$ subframes of the $P_2$ HS-DPCCH subframes;
    sending a channel quality indicator that is represented by using X bits and a category indicator to the base station by using an HS-DPCCH subframe, wherein a value of the category indicator is used to indicate whether the channel quality indicator that is represented by using the X bits is the first channel quality indicator ($CQI_1$) and the third channel quality indicator ($CQI_3$), or is the second channel quality indicator ($CQI_2$), or is the first channel quality indicator ($CQI_1$), the second channel quality indicator ($CQI_2$), and the third channel quality indicator ($CQI_3$);
    based on the detection of the demodulation pilot, sending the first channel quality indicator ($CQI_1$) and the second channel quality indicator ($CQI_2$) to the base station by using an HS-DPCCH subframe, and after the demodulation pilot is detected, according to an agreement with the base station and in a period of time from time $T_2$ to time $T_2'$ during sending a channel quality indicator, sending the second channel quality indicator ($CQI_2$), or sending the first channel quality indicator ($CQI_1$), the second channel quality indicator ($CQI_2$), and the third channel quality indicator ($CQI_3$), and in a period of time except from time $T_2$ to time $T_2'$ during sending a channel quality indicator, sending the first channel quality indicator ($CQI_1$) and the third channel quality indicator ($CQI_3$); or spreading the first channel quality indicator ($CQI_1$) and the third channel quality indicator ($CQI_3$) to a first orthogonal variable spreading factor code, spreading the second channel quality indicator ($CQI_2$) to a second orthogonal variable spreading factor code, and sending the first spreaded channel quality indicator ($CQI_1$), the spreaded second channel quality indicator ($CQI_2$), and the spreaded third channel quality indicator ($CQI_3$) to the base station by using an HS-DPCCH subframe.

7. The method according to claim 1, wherein, based on the detection of the demodulation pilot, information of $Y_2$ bits that is used to represent the second channel quality indicator ($CQI_2$), or information of Y bits that is in information of $W_2$ bits and is used to represent the second channel quality indicator ($CQI_2$) is a value agreed on with the base station.

8. The method according to claim 5, wherein the beamforming pilot is sent by the base station, beamwidth of the beamforming pilot is narrower than beamwidth of the primary pilot, and a beam direction of the beamforming pilot is time-varying.

9. A user equipment comprising:
a receiver, a transmitter, and a processor, wherein the receiver and the transmitter are separately connected to the processor,
the receiver is configured to receive a pilot sent by a base station;
the processor is configured to acquire a first channel quality indicator ($CQI_1$) based on detecting the pilot sent by the base station, and acquire a second channel quality indicator ($CQI_2$) based on detecting a demodulation pilot, wherein the demodulation pilot is used to demodulate a data channel during estimating a channel; and
the transmitter is configured to send the first channel quality indicator ($CQI_1$) or the second channel quality indicator ($CQI_2$) to the base station, depending on whether the demodulation pilot is detected, such that the base station distinguishes between the first channel quality indicator ($CQI_1$) and the second channel quality indicator ($CQI_2$).

10. The user equipment according to claim 9, wherein the transmitter is configured to set, in information of $W_1$ bits, the first channel quality indicator ($CQI_1$) that is represented by using $N_1$ bits and the second channel quality indicator ($CQI_2$) that is represented by using $M_1$ bits, and send the information of the $W_1$ bits to the base station by using a high speed dedicated physical control channel (HS-DPCCH) subframe.

11. The user equipment according to claim 9, wherein the transmitter is configured to, after the first channel quality indicator ($CQI_1$) is represented by using $N_2$ bits, and the second channel quality indicator ($CQI_2$) is represented by using $M_2$ bits, send information of the $N_2$ bits to the base station by using the first $Q_1$ subframes of $P_1$ HS-DPCCH subframes, and send information of the $M_2$ bits to the base station by using the last $P_1$-$Q_1$ subframes of the $P_1$ HS-DPCCH subframes.

12. The user equipment according to claim 9, wherein the transmitter is configured to send a channel quality indicator that is represented by using L bits and a category indicator to the base station by using an HS-DPCCH subframe, wherein a value of the category indicator is used to indicate whether the channel quality indicator that is represented by using the L bits is the first channel quality indicator ($CQI_1$) or the second channel quality indicator ($CQI_2$), or a value of the category indicator is used to indicate whether the channel quality indicator that is represented by using the L bits is the first channel quality indicator ($CQI_1$), or the first channel quality indicator ($CQI_1$) and the second channel quality indicator ($CQI_2$).

13. The user equipment according to claim 9, wherein the transmitter is configured to, based on the detection of the demodulation pilot, send the first channel quality indicator ($CQI_1$) to the base station by using an HS-DPCCH subframe, and after the demodulation pilot is detected, according to an agreement with the base station and in a period of time from time $T_1$ to time $T_1'$ during sending a channel quality indicator, send the second channel quality indicator ($CQI_2$), or send the first channel quality indicator ($CQI_1$) and the second channel quality indicator ($CQI_2$), and in a period of time except from time $T_1$ to time $T_1'$ during sending a channel quality indicator, send the first channel quality indicator ($CQI_1$).

14. The user equipment according to claim 9, wherein the transmitter is configured to spread the first channel quality indicator ($CQI_1$) to a first orthogonal variable spreading factor code, spread the second channel quality indicator ($CQI_2$) to a second orthogonal variable spreading factor code, and send the first channel quality indicator ($CQI_1$) and the second channel quality indicator ($CQI_2$) to the base station by using an HS-DPCCH subframe after being spreaded.

15. The user equipment according to claim 9, wherein the transmitter is configured to set, in information of $W_2$ bits, the first channel quality indicator ($CQI_1$) that is represented by using $X_1$ bits, the second channel quality indicator ($CQI_2$) that is represented by using $Y_1$ bits, and the third channel quality indicator ($CQI_3$) that is represented by using $Z_1$ bits, and send the information of the $W_2$ bits to the base station by using one HS-DPCCH subframe or two successive HS-DPCCH subframes.

16. The user equipment according to claim 9, wherein the transmitter is configured to, after the first channel quality indicator ($CQI_1$) is represented by using $X_2$ bits, the second channel quality indicator ($CQI_2$) is represented by using $Y_2$ bits, and the third channel quality indicator ($CQI_3$) is represented by using $Z_2$ bits, send information of the $X_2$ bits and information of the $Z_2$ bits to the base station by using the first $Q_2$ subframes of $P_2$ HS-DPCCH subframes, and send the information of the $X_2$ bits, information of the $Y_2$ bits, and the information of the $Z_2$ bits to the base station by using the last $P_2$-$Q_2$ subframes of the $P_2$ HS-DPCCH subframes.

17. The user equipment according to claim 9, wherein the transmitter is configured to send a channel quality indicator that is represented by using X bits and a category indicator to the base station by using an HS-DPCCH subframe, where a value of the category indicator is used to indicate whether the channel quality indicator that is represented by using the X bits is the first channel quality indicator ($CQI_1$) and the third channel quality indicator (CQI$_3$), or is the second channel quality indicator (CQI$_2$), or is the first channel quality indicator (CQI$_1$), the second channel quality indicator (CQI$_2$), and the third channel quality indicator (CQI$_3$).

18. The user equipment according to claim 9, wherein the transmitter is configured to, based on the detection of the demodulation pilot, send the first channel quality indicator (CQI$_1$) and the second channel quality indicator (CQI$_2$) to the base station by using an HS-DPCCH subframe, and after the demodulation pilot is detected, according to an agreement with the base station, and in a period of time from time T$_2$ to time T$_2$' during sending a channel quality indicator, send the second channel quality indicator (CQI$_2$), or send the first channel quality indicator (CQI$_1$), the second channel quality indicator (CQI$_2$), and the third channel quality indicator (CQI$_3$), and in a period of time except from time T$_2$ to time T$_2$' during sending a channel quality indicator, send the first channel quality indicator (CQI$_1$) and the third channel quality indicator (CQI$_3$).

19. The user equipment according to claim 9, wherein the transmitter is configured to spread the first channel quality indicator (CQI$_1$) and the third channel quality indicator (CQI$_3$) to a first orthogonal variable spreading factor code, spread the second channel quality indicator (CQI$_2$) to a second orthogonal variable spreading factor code, and send the first channel quality indicator (CQI$_1$), the second channel quality indicator (CQI$_2$), and the third channel quality indicator (CQI$_3$) to the base station by using an HS-DPCCH subframe after being spread.

20. The user equipment according to claim 9, wherein the pilot comprises a primary pilot sent on a primary common pilot channel,
the processor acquires the first channel quality indicator (CQI$_1$) based on detection of the primary pilot that is sent by the base station.

\* \* \* \* \*

UNITED STATES PATENT AND TRADEMARK OFFICE
CERTIFICATE OF CORRECTION

PATENT NO.         : 9,712,277 B2
APPLICATION NO.    : 14/736039
DATED              : July 18, 2017
INVENTOR(S)        : Zhang et al.

Page 1 of 1

It is certified that error appears in the above-identified patent and that said Letters Patent is hereby corrected as shown below:

Column 53, Line 23, in Claim 7 "Y bits" should read -- $Y_1$ bits --.

Signed and Sealed this
Twentieth Day of February, 2018

Andrei Iancu
*Director of the United States Patent and Trademark Office*